US012033464B2

(12) United States Patent
Haishima

(10) Patent No.: US 12,033,464 B2
(45) Date of Patent: Jul. 9, 2024

(54) INFORMATION PROCESSING DEVICE AND PAYOUT MANAGEMENT SYSTEM

(71) Applicant: Universal Entertainment Corporation, Tokyo (JP)

(72) Inventor: Jun Haishima, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 230 days.

(21) Appl. No.: 17/638,330

(22) PCT Filed: Jul. 28, 2020

(86) PCT No.: PCT/JP2020/028841

§ 371 (c)(1),
(2) Date: Feb. 25, 2022

(87) PCT Pub. No.: WO2021/039243

PCT Pub. Date: Mar. 4, 2021

(65) Prior Publication Data

US 2022/0292921 A1 Sep. 15, 2022

(30) Foreign Application Priority Data

Aug. 27, 2019 (JP) ................................. 2019-154964

(51) Int. Cl.
*G07F 17/32* (2006.01)

(52) U.S. Cl.
CPC ...... *G07F 17/3244* (2013.01); *G07F 17/3223* (2013.01)

(58) Field of Classification Search
None
See application file for complete search history.

(56) References Cited

U.S. PATENT DOCUMENTS

| | | | | |
|---|---|---|---|---|
| 2012/0115571 | A1 | 5/2012 | Kitamura et al. | |
| 2017/0316647 | A1 | 11/2017 | Ellis | |
| 2018/0040200 | A1* | 2/2018 | Ellis | G07F 17/3244 |
| 2020/0184771 | A1* | 6/2020 | Haishima | G06Q 50/34 |
| 2022/0012980 | A1* | 1/2022 | Haishima | G07F 17/3227 |
| 2022/0245998 | A1* | 8/2022 | Haishima | A63F 9/00 |

* cited by examiner

*Primary Examiner* — Ronald Laneau

(74) *Attorney, Agent, or Firm* — Simpson & Simpson, PLLC; S. Peter Konzel

(57) ABSTRACT

The present invention provides an information processing device and a payout management system capable of performing an appropriate operation in accordance with a classification of a game value such as a credit or the like. The information processing device includes an information processing unit that is configured to be able to transmit game value information that can be used for a game to an outside in association with registered information, and an interface that is capable of transmitting and receiving information to and from the gaming machine, in which the information processing unit distinguishes and manages a plurality of types of game values as the game value information.

5 Claims, 15 Drawing Sheets

FIG. 10

1520

| | THERE IS RESTRICTION | THERE IS NO RESTRICTION |
|---|---|---|
| IN PRINCIPLE, TREATED AS CASH | AR1 | AR2 |
| IN PRINCIPLE, NOT TREATED AS CASH | AR3 | AR4 |

FIG. 12

(SLOT MACHINE No.00001、MEMBER No.00001)

| GAME NUMBER | DEPOSIT (TOTAL / BREAKDOWN) 〔PHP〕 | PRIZE (RECEPTION) 〔PHP〕 | BET (RECEPTION) 〔PHP〕 | BALANCE (RECEPTION) 〔PHP〕 | BALANCE BREAKDOWN (CALCULATION)〔PHP〕 | CASHABLE AMOUNT 〔PHP〕 | HAND PAY AMOUNT (CALCULATION) 〔PHP〕 |
|---|---|---|---|---|---|---|---|
| 1 | (1,700,000)<br>V1:1,000,000<br>V2: 500,000<br>V3: 100,000<br>V4: 100,000 | — | 100,000 | 1,600,000 | V1: 1,000,000<br>V2: 500,000<br>V3: 0<br>V4: 100,000 | V1: –<br>V2: 500,000<br>V3: –<br>V4: – | (1,500,000)<br>V1: 1,000,000<br>V2: 500,000<br>V3: –<br>V4: – |
| 2 | — | 500,000 | 100,000 | 2,000,000 | V1: 1,000,000<br>V2: 1,000,000<br>V3: 0<br>V4: 0 | V1: –<br>V2: 1,000,000<br>V3: –<br>V4: – | (2,000,000)<br>V1: 1,000,000<br>V2: 1,000,000<br>V3: –<br>V4: – |
| 3 | — | — | 200,000 | 1,800,000 | V1: 800,000<br>V2: 1,000,000<br>V3: 0<br>V4: 0 | V1: –<br>V2: 1,000,000<br>V3: –<br>V4: – | (1,800,000)<br>V1: 800,000<br>V2: 1,000,000<br>V3: –<br>V4: – |
| ⋮ | ⋮ | ⋮ | ⋮ | ⋮ | ⋮ | ⋮ | ⋮ |
| x | — | 1,000,000 | 100,000 | 2,200,000 | V1: 500,000<br>V2: 1,700,000<br>V3: 0<br>V4: 0 | V1: –<br>V2: 1,700,000<br>V3: –<br>V4: – | (2,200,000)<br>V1: 500,000<br>V2: 1,700,000<br>V3: –<br>V4: – |

INFORMATION PROCESSING DEVICE AND PAYOUT MANAGEMENT SYSTEM

TECHNICAL FIELD

The present invention relates to an information processing device provided to be communicable with a gaming machine installed in game facilities such as a casino or the like, and a payout management system including the information processing device.

BACKGROUND ART

Related art discloses a slot machine that displays a plurality of symbols in a stopped state after displaying the plurality of symbols in a scrolled manner, and provides a game value (for example, a coin) based on a combination of the symbols displayed in the stopped state (refer to Patent Literature 1).

Meanwhile, in a casino of related art, when a winning that provides a prize exceeding a maximum amount preset in a slot machine occurs, a player calls an attendant and then the attendant determines a content of the prize and legitimacy thereof by confirming a winning state of the slot machine (for example, a combination of symbols of reels displayed in a stopped state).

When the legitimacy thereof is confirmed, the attendant issues a slip, obtains approval of an administrator, converts the slip into cash at a cash payment office referred to as a so-called cage, hands the cash over to the player, and performs an operation of cancelling a credit of the slot machine.

In this manner, with respect to the payment of a prize exceeding a predetermined amount, the prize amount is paid to the player by a payout method referred to as a so-called hand pay via the attendant.

In addition to the generation of the prize exceeding the predetermined amount, even when a problem occurs in a gaming machine such as a slot machine or the like, cash payment is performed via a credit cancellation operation and issuance of a slip by the attendant.

Here, there are a plurality of types and classifications of credits used in a casino or the like (refer to Patent Literature 2 and FIG. 2). For example, the credits are roughly divided into "cashable credits" that are treated as having a monetary value and "restricted credits" that are restricted from being treated as having a monetary value, and the credits are further subdivided depending on its characteristic, use, source, or the like.

In the gaming machine such as the slot machine or the like, it is possible to play a game with these credits, but the credits may not be classified into detailed credit categories and may not be handled and managed depending on a manufacturer and a model.

CITATION LIST

Patent Literature

PTL 1: US-A-2012-0115571
PTL 2: US-A-2017-0316647

SUMMARY OF INVENTION

Technical Problem

In related art, for example, at the time of performing a hand pay in which a credit of a gaming machine is cancelled and its payout is made directly to a player, a credit corresponding to "cashable credits" is mainly cancelled. On a gaming machine side, when the credit is cancelled, there are many "cashable credits" that output a total amount of the credits without considering a subclassification of the "cashable credits", such that payment cannot be performed in consideration of the subclassification and thus an operation on a casino side may be hindered.

An object of the present invention is to provide an information processing device and a payout management system capable of performing an appropriate operation in accordance with a classification of a game value such as a credit or the like.

Solution to Problems

An information processing device of the present invention is an information processing device connected to be able to transmit and receive information to and from a gaming machine that can play a game according to an input game value, grant a player a prize according to a result of the game, and store a balance of the game value, the device including:

- an information processing unit that is configured to be able to transmit game value information that can be used for the game to an outside in association with registered information; and
- an interface that is capable of transmitting and receiving the information to and from the gaming machine, in which the information processing unit distinguishes and manages a plurality of types of game values as the game value information.

According to this configuration, management in accordance with classification of a game value is performed, thereby making it possible to perform an appropriate operation in accordance with the classification of the game value.

In the information processing device of the present invention according to the configuration, when receiving, from the gaming machine, condition satisfaction information indicating that a predetermined condition for granting the prize to the player separately from a process of the gaming machine is satisfied, and receiving, from the gaming machine, erasure information indicating erasure of balance information of the game value stored in the gaming machine, the information processing unit transmits the balance information of the game value to the outside so that the plurality of types of game values can be distinguished.

According to this configuration, in a process such as a hand pay, in which a prize is granted to a player separately from the process of the gaming machine, a plurality of types of game values are transmitted in a distinguishable manner, thereby making it possible to perform an appropriate process in which the plurality of types of game values are distinguished.

The information processing device of the present invention according to the configuration further includes an information medium interface that receives an information media associated with specific information that specifies a player playing a game on the gaming machine, in which the information processing unit transmits the balance information to an account corresponding to the player specified via the received information medium.

According to this configuration, the balance information is transmitted to the player's account associated via the information medium in a distinguishable manner for a plurality of types of game values, thereby making it possible to more appropriately perform the process of granting the prize to the player separately from the process of the gaming machine.

In the information processing device of the present invention according to the configuration, the plurality of types of game values includes:

a first game value that can be used for playing the game, and the cash conversion of which is restricted; and a second game value that can be directly converted into cash.

According to this configuration, it is possible to distinguish between a game value that can be used for playing the game and the cash conversion of which is restricted and a game value that can be directly converted into cash, and to grant the game value to the player.

A payout management system of the present invention includes:

an information processing device that is connected to a gaming machine capable of playing a game according to an input game value and capable of storing a balance of the game value, and that can transmit information on the gaming machine to an outside; and an information medium interface that receives an information medium associated with specific information that specifies a player playing a game on the gaming machine, in which the information processing device distinguishes and manages a plurality of types of game values as the game value information, and when receiving, from the gaming machine, condition satisfaction information indicating that a predetermined condition for granting the prize to the player separately from a process of the gaming machine is satisfied, and receiving, from the gaming machine, erasure information indicating erasure of balance information of the game value stored in the gaming machine, the information processing device transmits the balance information of the game value by distinguishing the plurality of types of game values to an account corresponding to the player specified via the information medium received by the information medium interface.

According to this configuration, balance information of a game value can be associated with a player in a distinguishable manner for each of the plurality of types of game values, such that instead of performing a method of related art in which an attendant hands cash over to the player, it is possible to make payout to the player based on the balance information that can grasp a breakdown of the plurality of types of game values. Accordingly, a hand pay process can be performed smoothly and appropriately.

According to this configuration, processing time can be shortened as compared with a case in which payout to a player is made in cash.

According to this configuration, since cash payments and receipts are eliminated, it is possible to prevent occurrence of a human error related to cash handling.

According to this configuration, it is possible to prevent a fraudulent behavior by an attendant when the attendant hands cash over to a player.

According to this configuration, it is possible to avoid a troublesome labor that a player manually counts cash.

Advantageous Effects of Invention

According to the present invention, it is possible to provide an information processing device and a payout management system capable of performing an appropriate operation in accordance with a classification of a game value such as a credit or the like.

BRIEF DESCRIPTION OF DRAWINGS

FIG. 10 is a conceptual diagram illustrating an area for storing four types of game value information by type provided in a storage unit of the IC card according to the embodiment of the present invention;

FIG. 12 is a diagram illustrating balance information stored in an SMIB device 1700 according to the embodiment of the present invention and a breakdown thereof;

DESCRIPTION OF EMBODIMENTS

[Overall Configuration]

Figure 1:
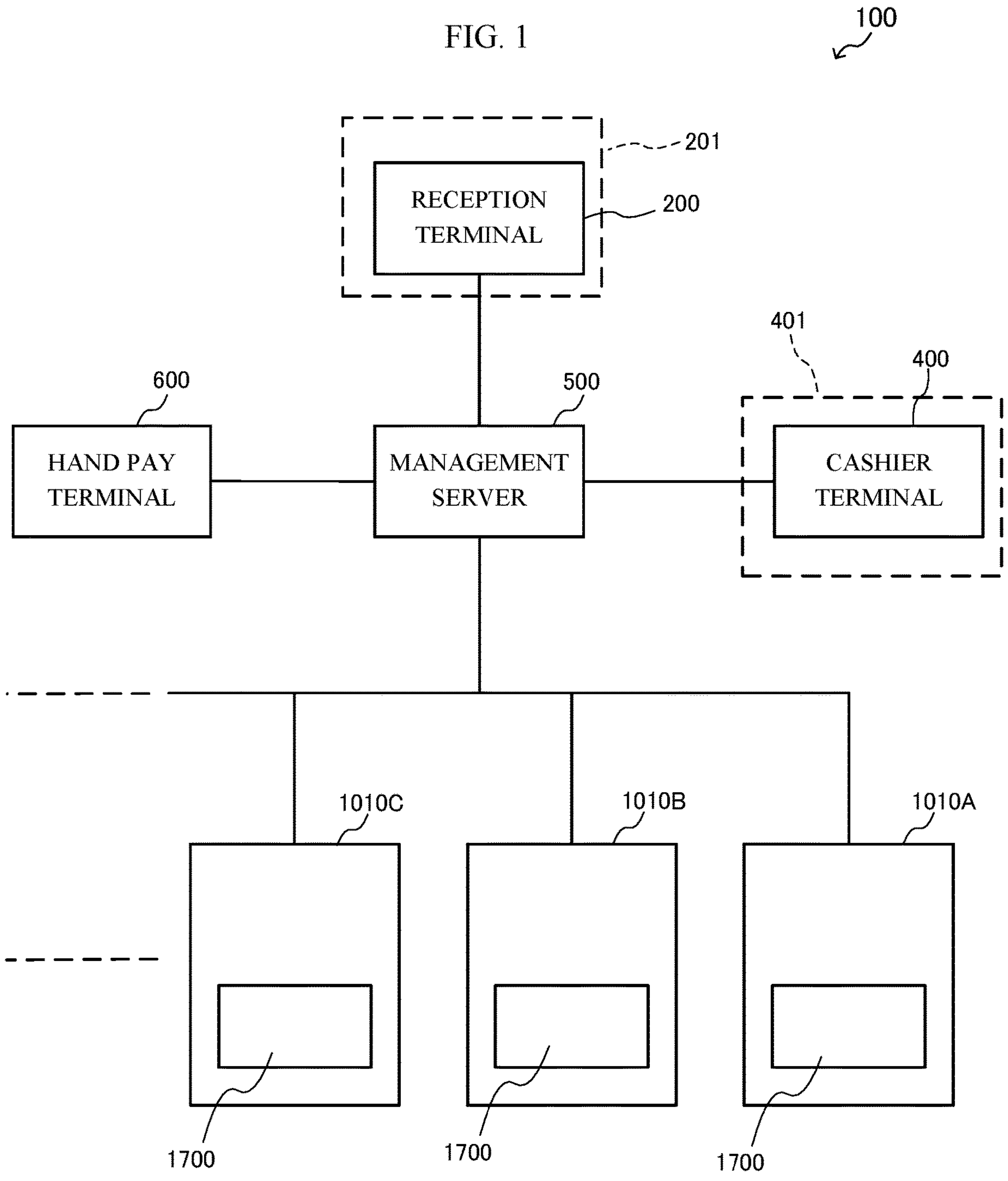
FIG. 1 is a diagram illustrating an overall configuration of a casino system according to an embodiment of the present invention.

FIG. 1 is a block diagram illustrating a casino system 100 including a payout management system according to an embodiment of the present invention. As illustrated in FIG. 1, the casino system 100 includes, for example, a plurality of gaming machines installed in a game facility such as a casino or the like (for example, slot machines 1010A, 1010B, . . . ) and a management server 500 connected thereto such that communication therebetween can be bidirectionally performed.

A reception terminal device 200 provided at a reception counter 201 is connected to the management server 500, and a membership number is registered in a database of the management server 500 via the reception terminal device 200, such that a member account corresponding to the membership number can be opened on the database. At the reception counter 201, the membership number registered in the management server 500 is stored in a newly issued member information card (an IC card 1500) and the member information card is handed over to a player registered as a member. When member registration is performed, a player who intends to be registered as a member fills out member information (for example, a name, an address, a telephone number, a nationality, a passport number, personal identification information that is issued by a government or the like and identifies an individual, and bank account information of a member and its password as necessary) on a predetermined form at the reception counter 201 and submits the predetermined form thereat. An attendant at the reception counter 201 registers a content described in the submitted form in the database of the management server 500 by inputting the content together with the newly issued membership number via the reception terminal device 200. Accordingly, the input member information is registered in the database thereof in association with the membership number.

Credit data stored in the member account is used when the member plays a game on the slot machines 1010A, 1010B, . . . (hereinafter, simply referred to as a slot machine 1010), and credit data of an amount corresponding to a prize generated in the slot machine 1010 as a result of the game is configured to be added to credit data of a corresponding member account on the database. As a method for inputting the credit data to the member account, in addition to an input method in which cash is paid at the reception counter 201 and a reception attendant operates the reception terminal device 200 to input the cash, it is also possible to use an input method associated with a credit card of a bank, that is, a method for transmitting cash data from a bank account of the member to the member account of the management server 500. The slot machine 1010 includes a cash input unit, and a player can also play a game by directly inserting cash into the slot machine 1010.

In this manner, the IC card 1500 (the member information card) provided with the membership number is issued at the reception counter 201, and is used when a player registered as a member plays a game on the slot machine 1010. In the database of the management server 500, the credit data is stored in association with the membership number (and a card number), and the IC card 1500 (the member information card and a non-member information card) also stores data representing a credit balance of the member (a non-member). The credit data stored on the IC card 1500 side is backup data used in an emergency such as when a system failure occurs.

The management server 500 is connected to a cashier terminal device 400 of a cashier 401 referred to as a cage for performing cash conversion based on the IC card 1500 (the member information card and the non-member information card). When a player who plays a game by using the IC card 1500 as the member information card ends the game, information such as a credit balance of a member account specified by the IC card 1500 is updated by a game termination process executed in the slot machine 1010.

Accordingly, after the game termination process is performed in the slot machine 1010, the player inserts the IC card 1500 into a card reading device of the cashier terminal device 400, such that a balance of the member account of the player associated with the membership number stored in the IC card 1500 is paid out to the member player.

In the slot machine 1010 (a slot machine interface board (SMIB) device 1700), an amount of a prize generated when a game is played by directly inserting cash without using the IC card 1500 and a remaining balance after a BET are associated with the card number of the new IC card 1500 (the non-member information card) stocked in advance in the slot machine 1010 (the SMIB device 1700), thereby issuing the IC card 1500.

When the non-member information card is issued in the slot machine 1010, the SMIB device 1700 of the slot machine 1010 transmits, to the management server 500, a fact that the non-member information card is issued together with the card number of the non-member information card (the IC card 1500) to be issued. By receiving these pieces of information, the management server 500 opens a non-member account associated with the card number on the database of the management server 500. Prize money given to a player as a result of the game in the slot machine 1010 and a remaining amount of an input amount after a BET are stored in the non-member account on the management server 500 opened in association with the card number of the non-member information card to be newly issued, and are also stored in the non-member information card to be issued for backup. The player inserts the non-member information card (the IC card 1500) newly issued in the slot machine 1010 (for example, the slot machine 1010A in FIG. 1) to other slot machines (the slot machines 1010B, 1010C, . . . in FIG. 1), and uses the number of credits corresponding to balance information associated with the non-member information card in the management server 500 and stored in the non-member information card for backup, thereby making it possible to play a new game.

A hand pay terminal device 600 is connected to the management server 500. The hand pay terminal device 600 is a terminal operated by an attendant during a hand pay process which will be described later. In the slot machine 1010, when a prize exceeding a preset amount is generated and when a device malfunction occurs, a player calls an attendant to perform a hand pay process.

Specifically, for example, when a prize exceeding a preset amount is generated as a result of a game executed in the slot machine 1010, a display showing the generation of the prize and urging a player to call an attendant is performed on a display unit (described later) of the slot machine 1010.

Figure 3:
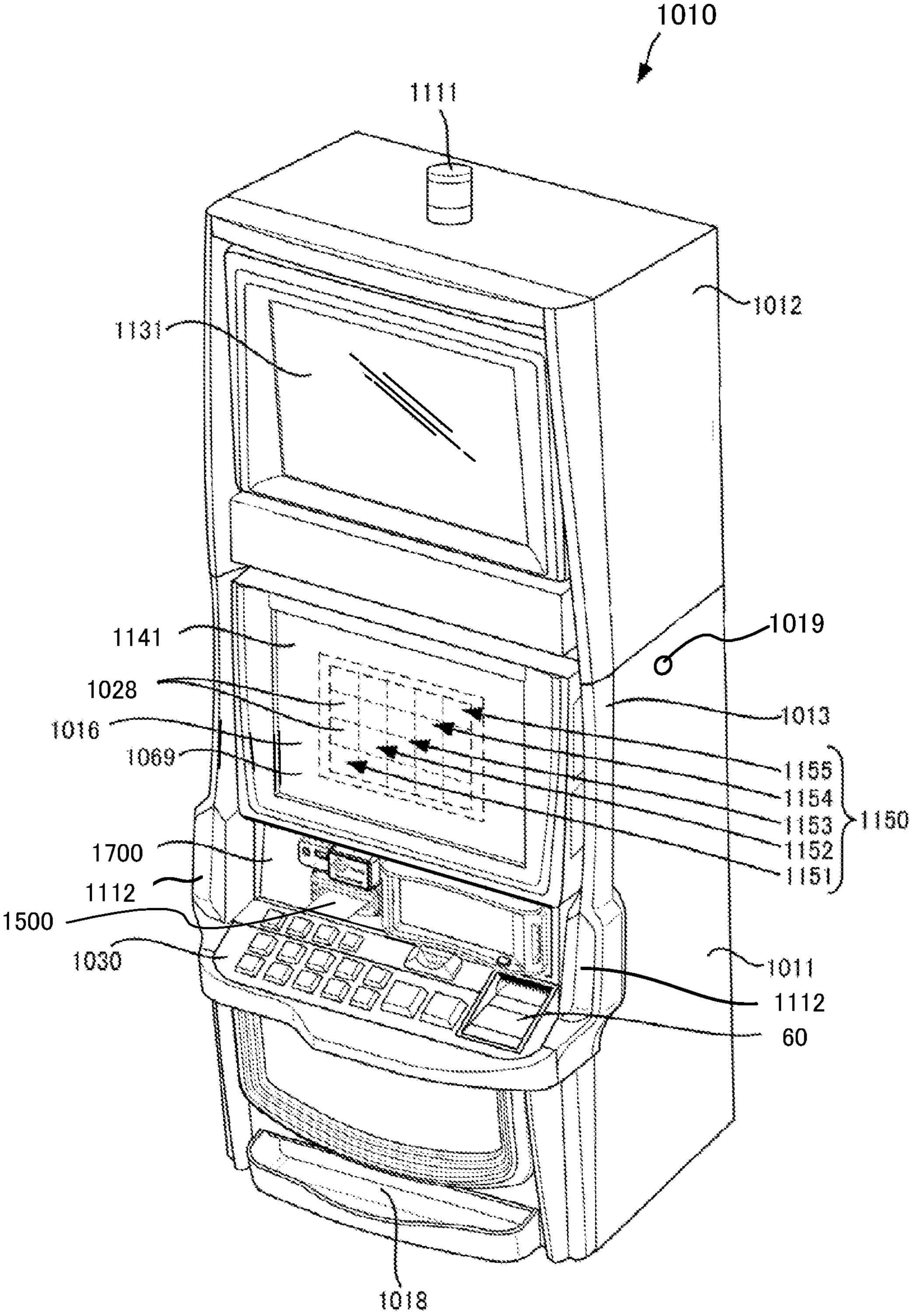
FIG. 3 is a perspective view illustrating a configuration of a slot machine according to an embodiment of the present invention.

When a player operates a call button 1739 (FIGS. 4 and 6) provided in the SAM device 1700 to call an attendant, the attendant operates a reset key switch 1019 (FIG. 3) provided in the slot machine 1010 by using a predetermined key, such that the credit data (the balance information) of the player stored in the slot machine 1010 is transmitted to the management server 500 and added to an account of the player. Details of the hand pay process will be described later.

Figure 2:
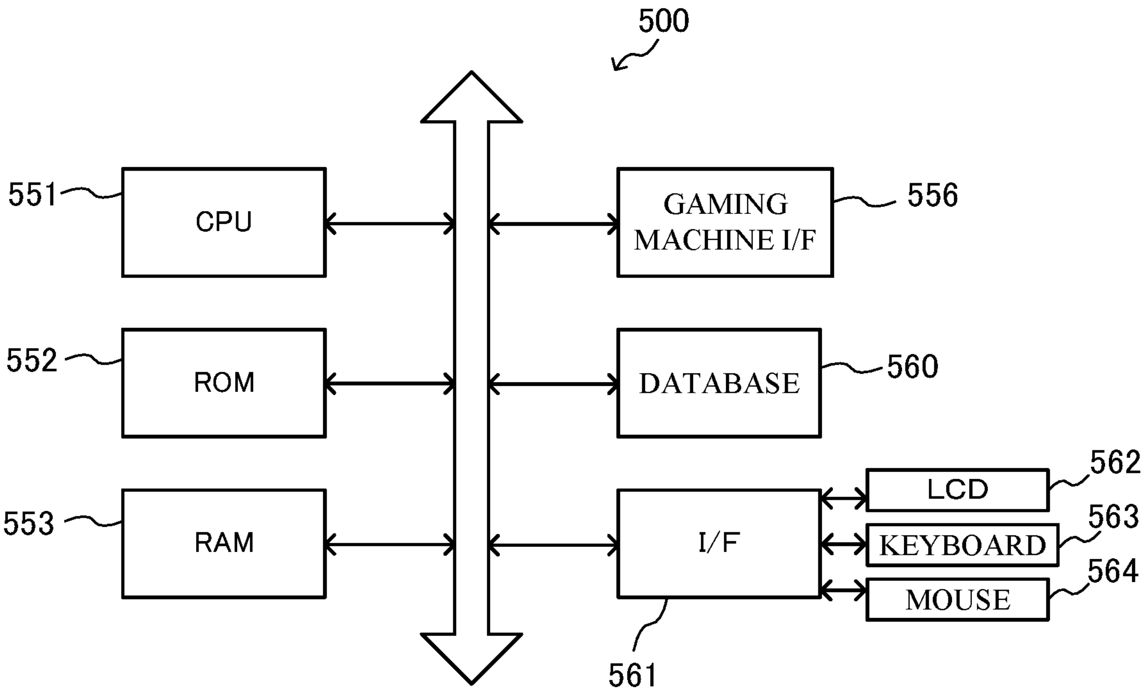
FIG. 2 is a block diagram illustrating a configuration of a management server of the casino system according to the embodiment of the present invention.

FIG. 2 is a block diagram illustrating a configuration of the management server 500. As illustrated in FIG. 2, in the management server 500, a central processing unit (CPU) 551, a read only memory (ROM) 552, a random access memory (RAM) 553, a gaming machine I/F 556, a database 560, and an I/F 561 are configured to be connected to a bus, and a liquid crystal display (LCD) 562, a keyboard 563, and a mouse 564 are configured to be connected thereto via the I/F 561. The database 560 stores an information card number of a member information card, a membership number of a member, member information, balance information (credit data) and game history information associated with the member information card, an information card number of a non-member information card issued to a non-member, and balance information (credit data) and game history information associated with the information card number.

[Overall Configuration of Slot Machine]

Next, an overall configuration of the slot machines 1010A, 1010B, . . . (hereinafter referred to as the slot machine 1010) will be described with reference to FIG. 3.

In the slot machine 1010, a member information card (the IC card 1500), a non-member information card (the IC card 1500), a banknote, or electronic valuable information equivalent to these game values are used as a game medium. Particularly, in the embodiment, credit-related data such as cash data or the like stored in the member information card or the non-member information card (hereinafter, referred to as the IC card 1500) is used.

The slot machine 1010 includes a cabinet 1011, a top box 1012 installed on an upper side of the cabinet 1011, a main door 1013 provided on a front surface of the cabinet 1011.

The main door 1013 includes a symbol display device 1016 referred to as a lower image display panel 1141. The symbol display device 1016 is formed of a transparent liquid crystal panel. A screen displayed by the symbol display device 1016 includes a display window 1150 in the center thereof. The display window 1150 is formed of 20 pieces of display blocks 1028 in five columns and four rows. The four pieces of display blocks 1028 in each column form pseudo reels 1151 to 1155 and are configured to be rotated in response to an operation of a player. Each of the pseudo reels 1151 to 1155 can be rearranged in such a manner that the four pieces of display blocks 1028 are moved and displayed in a downward direction while changing a speed as a whole such that a symbol displayed on each of the display blocks 1028 is rotated in a vertical direction and then is stopped.

Here, the "rearrangement" indicates a state in which the symbols are arranged again after arrangement of the symbols is released. The "arrangement" indicates that the symbols are in a state of being visually confirmable by a player outside. The slot machine 1010 executes a so-called slot game in which a dividend corresponding to a winning combination is provided depending on the arrangement state of the symbols based upon the stop state of the rotating pseudo reels 1151 to 1155.

The embodiment describes a case in which the slot machine 1010 is a so-called video slot machine, and the slot machine 1010 of the present invention may adopt a so-called mechanical reel, or some of the pseudo reels 1151 to 1155 may be replaced by the mechanical reel.

A touch panel 1069 is provided on a front surface of the symbol display device 1016, and a player can input various instructions by operating the touch panel 1069. An input signal is transmitted from the touch panel 1069 to a main CPU 1071.

An upper image display panel 1131 is provided on a front surface of the top box 1012. The upper image display panel 1131 is formed of a liquid crystal panel and forms a display. The upper image display panel 1131 displays an image related to a performance, and an image indicating an introduction of a content of a game and a description of a rule thereof. The top box 1012 is provided with a lamp 1111.

A number-of-credits display unit (not illustrated) is displayed at an upper part of the display window 1150, and the current number of credits is displayed thereon. Here, the "credit" is a virtual game medium on a game used when a player makes a BET. A total number of credits currently owned by the player is configured to be displayed on the number-of-credits display unit.

A fractional cash display unit (not illustrated) is displayed at a lower part of the number-of-credits display unit. The fractional cash display unit displays fractional cash. The "fractional cash" indicates cash that is not converted into credit because an inserted amount of money is not sufficient.

A reset key switch 1019 is provided on a side surface of the cabinet 1011. A predetermined key is inserted into the reset key switch 1019 and the predetermined key is turned, such that the reset key switch 1019 can cause a game controller 70 to output an operation signal of the reset key switch 1019.

The IC card 1500 is inserted into the SMIB device 1700 which will be described later, and the number of credits stored in the IC card 1500 is displayed on the number-of-credits display unit. These numerical values are stored in the management server 500 in association with an identification code of the member card.

The SMIB device 1700 is incorporated in the cabinet 1011 at a lower part of the lower image display panel 1141. Speakers 1112 are respectively provided on the left and right sides of the SMIB device 1700, and the lamp 1111 is provided on an upper part of the top box 1012. In the slot machine 1010, performance of a unit game is executed by displaying an image on the upper image display panel 1131, outputting a sound by the speaker 1112, outputting light by the lamp 1111, or the like. The SAM device 1700 is provided incidentally or inherently in the slot machine 1010. A control panel 1030 including various operation buttons operated by the player is provided at a lower part of the SAM device 1700.

[Configuration of SAM Device]

Figure 4:
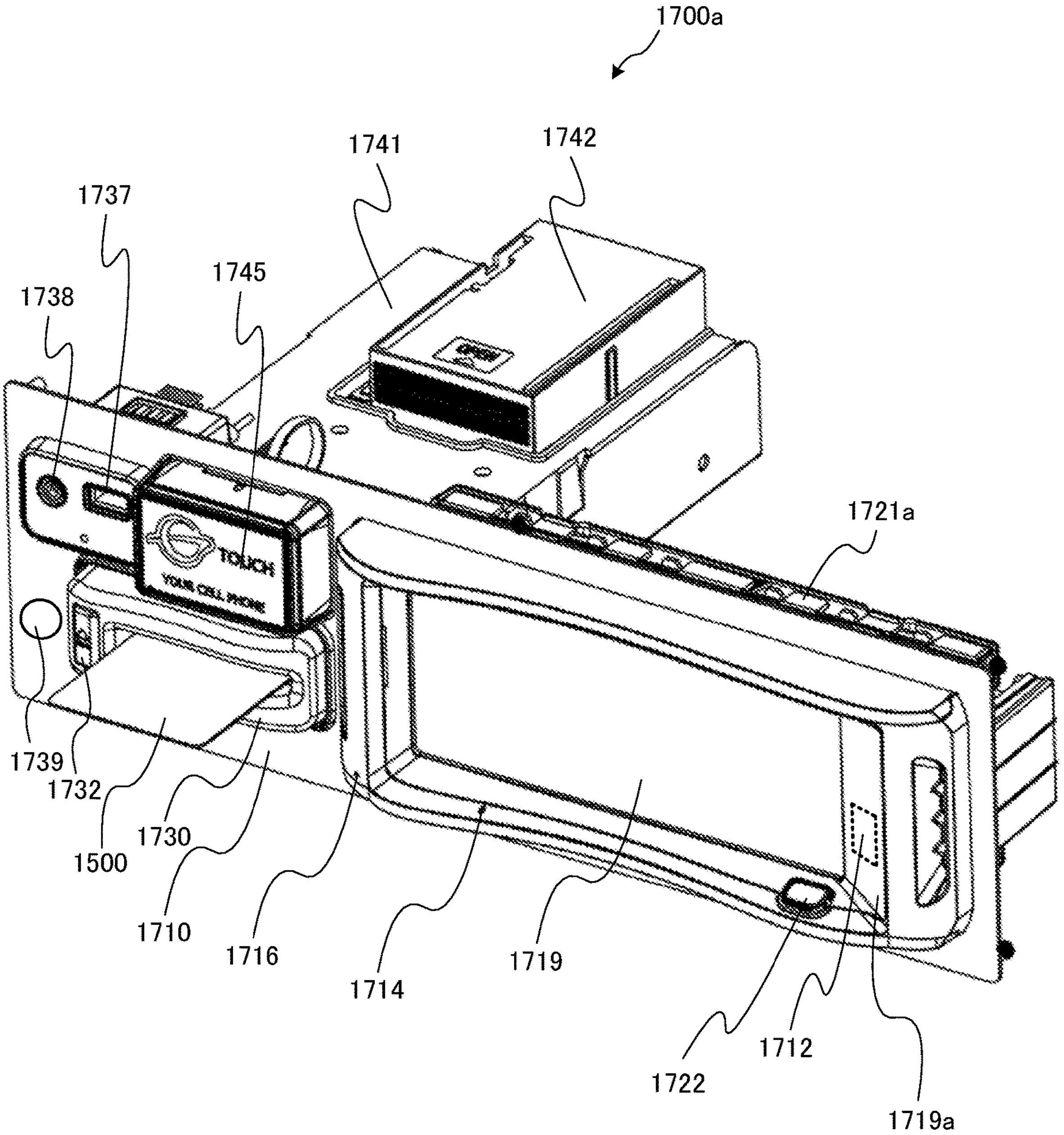
FIG. 4 is a perspective view illustrating an SMIB device (an information processing device) incorporated in the slot machine according to the embodiment of the present invention.

FIG. 4 is a diagram illustrating a structural unit 1770*a* including an LCD 1719 provided on a surface of a panel 1710, a card unit 1741 provided on a back side of the panel 1710, or the like in the SMIB device 1700 (FIG. 3) incorporated in the slot machine 1010. The SAM device 1700 can be incorporated into various types of gaming machines from various manufacturers by performing data exchange between gaming machines by using a common data interface.

The SMIB device 1700 includes the panel 1710, each unit disposed on a front surface of the panel 1710 is visually recognized by a player, and a member disposed on a back surface of the panel 1710 is housed inside the slot machine 1010 such that the member cannot be seen by the player.

The LCD 1719 having a touch panel function is provided on a right side of the front surface of the panel 1710. The LCD 1719 displays, for example, information on the member and information for the member, and a screen size is 6.2 inches (about 15.7 cm). An LCD cover 1719*a* is provided around a periphery of the LCD 1719. In this example, the LCD 1719 is configured to have the touch panel function, and an instruction of the player may be input by another input device such as a keyboard and a mouse.

A full color LED 1721*a* and a full color LED 1721*b* (FIG. 6) are configured to be capable of performing light emission contributing to a warning of a fraudulent behavior.

An image capturing window 1712 is provided on a right side of the LCD 1719, and a human body detection camera disposed inside the LCD cover 1719*a* captures an image of the player or the like through the image capturing window 1712. The image capturing window 1712 may be, for example, a half mirror material to which a shield process such as smoke or the like is applied.

A card insertion slot 1730 into and from which the IC card 1500 can be inserted and removed is provided at a lower left side of the front surface of the panel 1710. A card insertion unit of the card insertion slot 1730 is provided with a full color LED 1731 (refer to FIG. 5), and it is possible to notify the remaining number of IC cards 1500 collected and stacked in a card stacker 1742 which will be described later by lighting the full color LED 1731 with a plurality of colors. The card insertion slot 1730 includes an eject button 1732, and a red LED 1733 (refer to FIG. 5) provided near the eject button 1732 is configured to be turned on so that a position of the eject button 1732 and a process of an eject operation can be understood.

The card unit 1741 and the card stacker 1742 are provided at a position on the back side of the panel 1710 corresponding to the card insertion slot 1730, and the card insertion slot 1730 is configured as a part of the card unit 1741. About 30 pieces of IC cards 1500 can be stored in the card stacker 1742, and when a non-member player who newly plays a unit game performs settlement of a credit, the IC card 1500 stored in the card stacker 1742 is taken out and discharged to the card insertion slot 1730 as a non-member information card. That is, when the game is played with a currency inserted into a bill entry 60 without inserting the IC card 1500 from the card insertion slot 1730, the IC card 1500 is discharged from the card insertion slot 1730 as the non-member information card in a state of being not associated with personal information of a member database.

On the other hand, when the member information card (the IC card 1500) associated with the personal information of the player in advance is inserted into the card insertion slot 1730, or when the non-member information card (the IC card 1500) that is not associated with the personal information is inserted into the card insertion slot 1730, the inserted IC card 1500 is retained in the card unit 1741, and information such as balance information which is a result of the game in the slot machine 1010 is written to the IC card 1500 retained therein when the card is discharged.

The member information card or the non-member information card (the IC card 1500) retained in the card unit 1741 updates credit information (storage information in first to fourth storage areas) by NFC or the like at the time of the settlement of the credit when a CASHOUT button is operated, and then the IC card 1500 is discharged from the card insertion slot 1730. The IC card 1500 is completely stored inside the card unit 1741 while the player plays the unit game.

When absence of the player is detected by the human body detection camera or the like even though the IC card 1500 remains at the time of the settlement of the credit, the IC card 1500 can also be configured to be stored in the card stacker 1742. Accordingly, for example, when the IC card 1500 is left behind and the player leaves his or her seat in a state where the player knows that the remaining credit is low, and even when the player simply forgets to take the IC card 1500 and leaves his or her seat, the IC card 1500 does not remain retained in the card unit 1741 for a long time.

A USB terminal 1737 and an audio terminal 1738 are provided on an upper left side of the front surface of the panel 1710. The USB terminal 1737 is configured to perform charging or the like by connecting a USB device to the USB terminal 1737. The audio terminal 1738 is, for example, a four-pole terminal, and a headset is inserted thereinto, such that a user can talk to the other party with a headphone and a microphone. The audio terminal 1738 can be configured as a two-pole or a three-pole terminal such that the user also can listen to a voice with the headphone.

A touch unit 1745 is provided on the front surface of the panel 1710 and on the left side of the LCD 1719. The touch unit 1745 includes, as an information medium, a writer that writes data by data communication with respect to an IC device including an IC chip (for example, a non-contact IC card, and a mobile phone, a smart phone, or the like provided with a communication function by NFC); and a radio frequency identification (RFID) module that can function as a reader that reads the data from the IC device by the data communication. LEDs 1746 (not illustrated) are respectively disposed at four corners of a front surface of the touch unit 1745. In addition to the touch unit 1745, or in place of the touch unit 1745, an information recording medium reading device for reading information stored in an information recording medium such as a magnetic card may be provided. In this case, the magnetic card can be used as the member card instead of the IC card 1500.

As described above, in the SMIB device 1700 according to the embodiment of the present invention, various devices having a microphone function, a camera function, a speaker function, a display function, or the like are integrated to form one unit, thereby achieving space saving. Accordingly, for example, when the LCD is directed toward the player in a state where each of the functions is installed as a single part, there is no inconvenience that the speaker cannot be installed toward the player.

In the SMIB device 1700 according to the embodiment of the present invention, when the IC card 1500 is inserted into the card insertion slot 1730, the content of the IC card 1500 is configured to be read by the card unit 1741 and the entire IC card 1500 is configured to be taken in and retained (inside the SMIB device 1700). In addition thereto, the touch unit 1745 is provided, thereby making it possible to further perform the data communication with another IC card, the mobile phone, and the smart phone.

[Internal Configuration Provided in Slot Machine]

Figure 5:
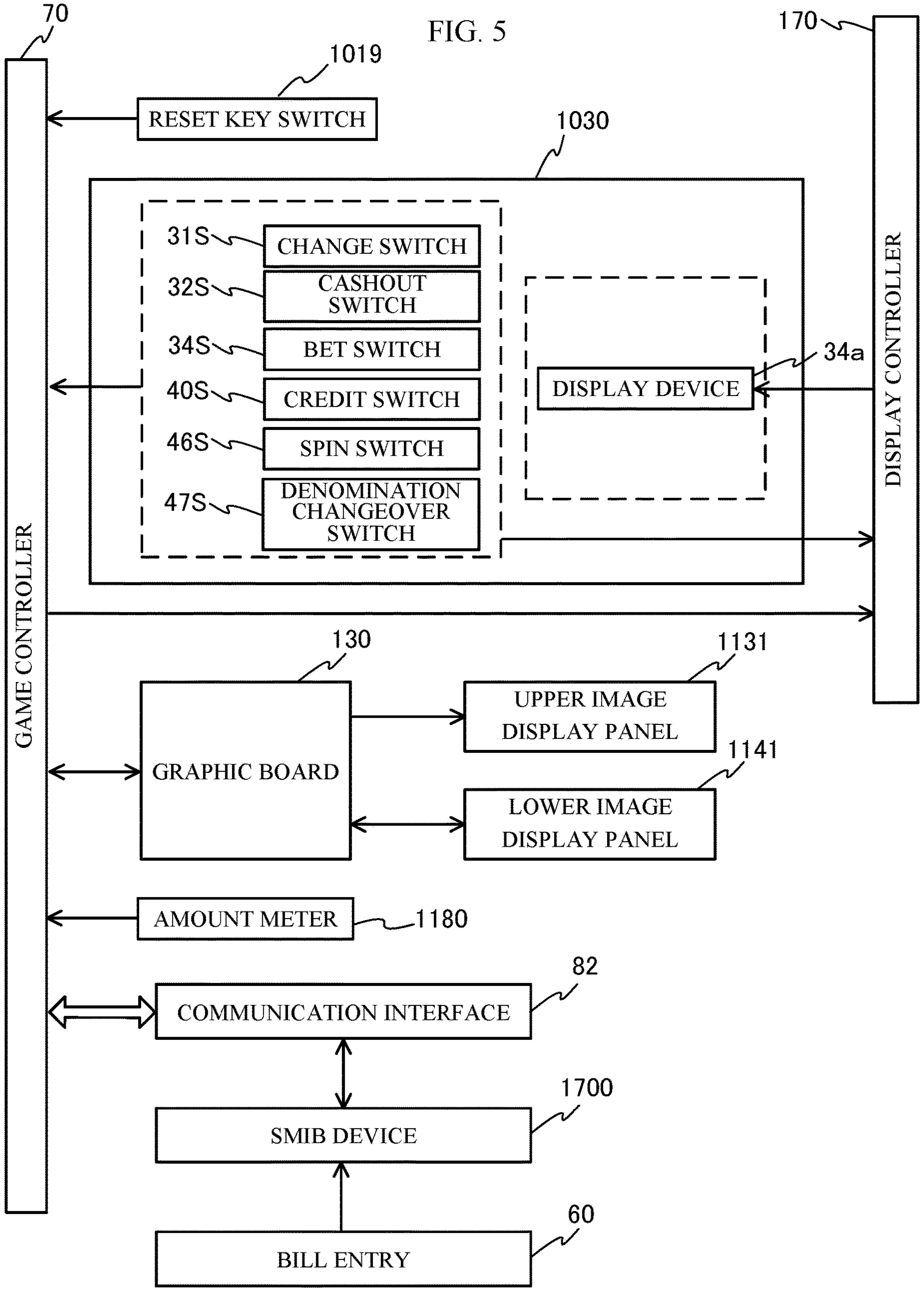
FIG. 5 is a block diagram illustrating an internal configuration of the slot machine according to the embodiment of the present invention.

Next, an internal configuration of the slot machine 1010 and the control panel 1030 provided in the slot machine 1010 will be described with reference to FIG. 5.

A game controller 70 is provided on a circuit substrate for a game inside the slot machine 1010. A display controller 170 is provided on a circuit substrate for a control panel different from the circuit substrate for the game of the game controller 70 inside the control panel. The game controller 70 and the display controller 170 respectively include: a central processing unit (CPU) provided on the circuit substrate for the game and the circuit substrate for the control panel; an electrically erasable and programmable read only memory (EEPROM) for storing programs executed by the CPU and data used for these programs in a rewritable manner; and a random access memory (RAM) for temporarily storing data when the program is executed. The game controller 70 and the display controller 170 are configured in cooperation with these hardware and software in the storage device described above. The display controller 170 is not limited to being provided separately from the game controller 70, and the game controller 70 may have the function of the display controller 170.

For example, the storage device of the game controller 70 stores the data and the programs used when the CPU operates. For example, when the above-described game program, a game system program, and an authentication program are taken in from an external storage device, the game controller 70 can store these programs. The storage device of the game controller 70 is provided with a work area used when the program is executed. For example, an area for storing the number of times of playing a game, the number of BETs, the number of payouts, the number of credits, or the like, and an area for storing symbols (code numbers) determined by lottery are provided.

As described above, the game controller 70 executes the game and controls the symbol display device 1016 so as to rearrange the symbols corresponding to the game. As described above, the game controller 70 validates a valid line of the number corresponding to a credit button (not illustrated) that receives an input in a display frame of three rows and five columns formed of a plurality of blocks, and when the same type of symbols of a predetermined number or more are rearranged in the validated valid line, a line dividend corresponding to the type of symbols is granted. That is, the game controller 70 is configured to control the slot machine by causing the CPU to execute the game program and the game system program in the storage device. The display controller 170 includes a graphic board and displays a BET amount required for a display device (not illustrated) of the credit button.

The control panel 1030 includes a CHANGE switch 31S, a CASHOUT switch 32S, a BET switch 34S, a credit switch 40S, a spin switch 46S, and a denomination changeover switch 47S corresponding to the above-described respective buttons. Each switch detects that the corresponding button is pressed by a player and outputs a signal to the game controller 70 and the display controller 170. The game controller 70 controls the BET based on the signals from the respective switches. The display controller 170 transmits the signals from the respective switches to the game controller 70, and the game controller 70 determines, based on the signals, contents to be displayed on the display device provided with the button, and transmits a determination result to the display controller 170, such that the contents are displayed on the respective buttons.

The game controller 70 is connected to a graphic board 130, a power supply unit 81, and a communication interface 82 in addition to the speaker, the touch panel, or the like.

The graphic board 130 controls, based upon a control signal output from the game controller 70, the display of the images respectively performed by the upper image display panel 1131 and the lower image display panel 1141. The graphic board 130 includes a VDP for generating image data, a video RAM for storing the image data generated by the VDP, or the like.

The graphic board 130 includes the video display processor (VDP) for generating the image data based upon the control signal output from the game controller 70 and the video RAM for temporarily storing the image data generated by the VDP. The image data used when generating the image data by the VDP is stored in the game program of the storage device. The graphic board 130 has a function of outputting operation results of various touch icons provided on the lower image display panel 141 to the game controller 70.

The communication interface 82 is a unit for performing communication with the SMIB device 1700 and an external control device. When receiving an input signal from the bill entry 60, the SMIB device 1700 transmits input currency information in the input signal to the game controller 70 via the communication interface 82. When the IC card is inserted into the card insertion slot, the SMIB device 1700 transmits the balance information stored in the IC card to the game controller 70 via the communication interface 82. The SMIB device 1700 writes credit data to the IC card inserted into the card insertion slot based upon the control signal received from the game controller 70 via the communication interface 82.

An amount meter 1180 is connected to the game controller 70. The amount meter 1180 stores an integrated value of a BET game value (cash, a first game value, and a second game value) after each game and an integrated value of a prize amount at the time of each game, and, as necessary, can transmit the stored integrated values to the SMIB device 1700 and other devices via the communication interface 82. The amount meter 1180 also stores an amount of a game value canceled by an operation of the reset key switch 1019 and transmits the amount thereof to the SMIB device 1700 via the communication interface 82.

The game controller 70 can transmit a signal to the display controller 170 by using a well-known communication protocol and communication connection. For example, the game controller 70 transmits, to the display controller 170, a signal indicating whether or not a current state is a reception permission state of various buttons.

In the game controller 70, credit data input by a player can be stored in, for example, an internal RAM, and the credit data can be input to a game play by a BET operation of the player. The credit data stored in the RAM increases or decreases depending on a result of the game.

When the player operates the CASHOUT button provided on the slot machine 1010 after the game, the game controller 70 transmits, to the SMIB device 1700, payout information including information representing a credit balance stored in the RAM at this time (information representing a payout amount).

The SMIB device 1700 receiving the payout information transmits the payout information to the management server 500, and stores the payout information in a member account (or a non-member account) in association with the player (a member or a non-member), thereby updating the member account.

In this manner, in a normal payout process, the credit balance is transmitted to the management server 500 as the payout information, and the member (or the non-member) account is updated.

On the other hand, as a result of a game of a gaming machine, when a prize amount exceeding a preset amount is generated, or when malfunction occurs in the gaming machine, an attendant inserts a predetermined key into the reset key switch 1019 of the slot machine 1010 and turns the predetermined key, such that the operation result is input to the game controller 70. The game controller 70 forcibly pays out the credit balance stored in the RAM of the game controller 70 at this time, and performs a process of erasing the forcibly paid out credit balance from the RAM.

When the reset key switch 1019 is operated, the credit balance is once stored in the RAM 1753 (FIG. 6) of the SMIB device 1700, and then the credit balance is transmitted to the management server 500 together with information identifying the player playing the game at this time. When a player inserts the member information card (the IC card 1500) into the gaming machine 1010 (the SMIB device 1700) and plays a game, member information read from the member information card is used as the information for identifying the player. This member information is read from the member information card (the IC card 1500) inserted into the card unit 1741 and stored in the RAM 1753.

[Internal Configuration of SMIB Device]

Figure 6:
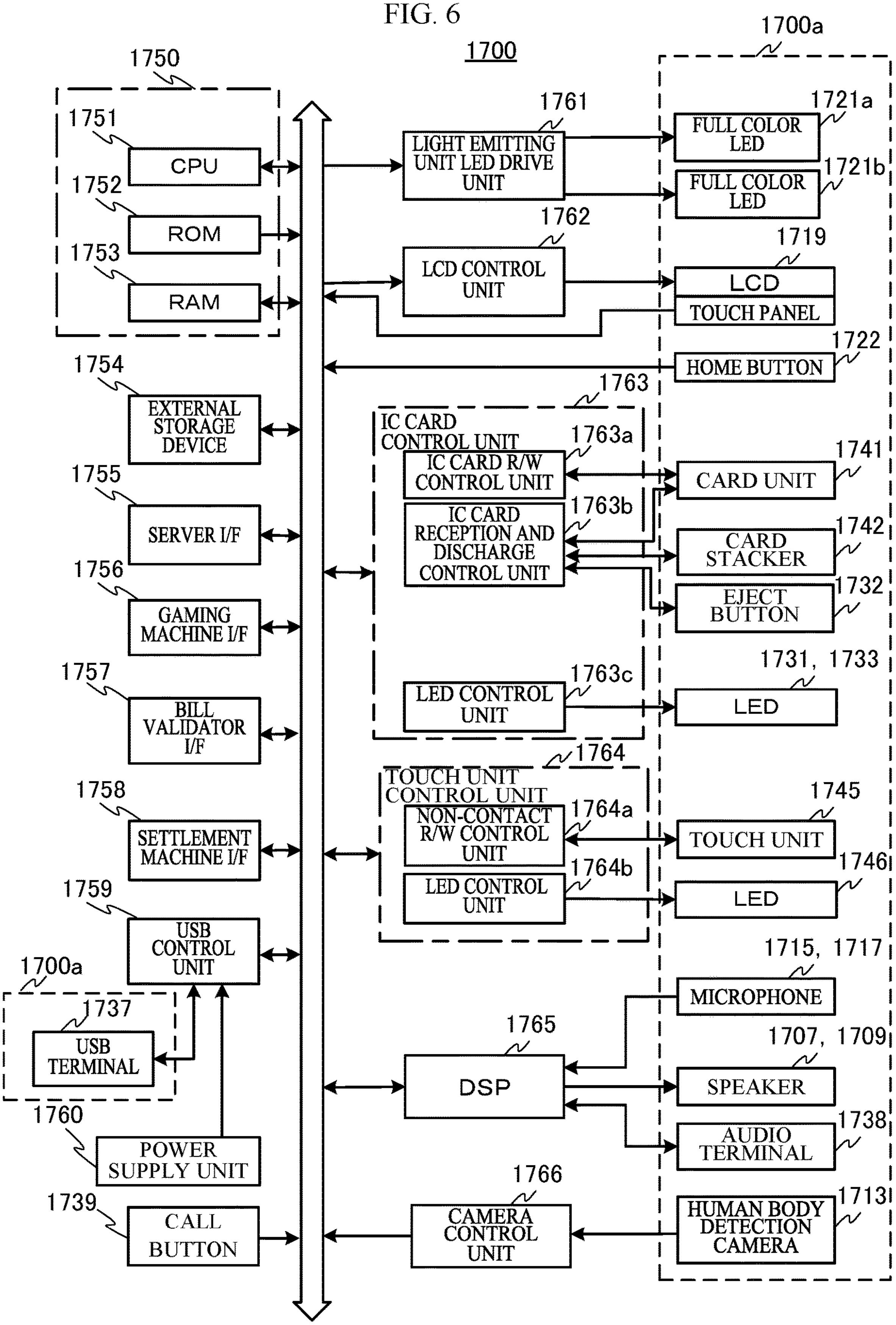
FIG. 6 is a block diagram illustrating a configuration of the SMIB device (the information processing device) according to the embodiment of the present invention.

Next, a configuration of a circuit provided in the SMIB device 1700 will be described with reference to FIG. 6. In FIG. 6, a structure unit 1700*a* of the SMIB device 1700 illustrated in FIG. 4 is shown by being surrounded by a broken line.

An SMIB controller 1750 that controls the SMIB device 1700 includes a CPU 1751, a ROM 1752, and a RAM 1753.

The CPU 1751 performs execution control of each component of the SMIB device 1700, and executes or computes various programs stored in the ROM 1752. For example, the CPU 1751 executes a credit update program to update credit related data stored in the IC card 1500.

The ROM 1752 is formed of a memory device such as a flash memory or the like, and stores permanent data to be executed by the CPU 1751. For example, the ROM 1752 stores the credit update program that rewrites the credit related data stored in the IC card 1500, an interlocking performance control program to be executed in response to a request from a bonus server (not illustrated), and a program to be executed in response to a request from the management server 500.

The RAM 1753 temporarily stores data necessary when various programs stored in the ROM 1752 are executed.

An external storage device 1754 is, for example, a storage device such as a hard disk device, and stores a program to be executed by the CPU 1751 and data used by the program to be executed by the CPU 1751.

A server interface (I/F) 1755 implements data communication between a server such as the management server 500 or the like and the SMIB device 1700. A gaming machine interface (I/F) 1756 implements data communication between the game controller 70 of the slot machine 1010 and the SMIB device 1700, and a prescribed protocol may be used for the data communication therebetween.

The SMIB device 1700 is connected to the bill entry 60 via a bill validator interface (I/F) 1757 and connected to a settlement machine (not illustrated) via a settlement machine interface (I/F) 1758, and can transmit and receive data as necessary.

A USB control unit 1759 determines whether to supply power from a power supply unit 1760 to the USB terminal 1737 and can charge the USB terminal 1737 when a predetermined condition is satisfied. A player can charge an electronic device by connecting the electronic device to the USB terminal 1737 when the predetermined condition is satisfied.

In order to cause a light emitting plate 1720*a* on an upper side of the LCD 1719 to emit light in response to a report request from the management server 500, an interlocking performance start request from the bonus server (not illustrated), or the like, a light emitting unit LED drive unit 1761 controls the full color LED 1721*a* to be turned on at a predetermined timing, and in order to cause a light emitting plate on a lower side of the LCD 1719 to emit light, the light emitting unit LED drive unit 1761 controls the full color LED 1721*b* to be turned on at a predetermined timing.

An LCD control unit 1762 performs control so that information contributing to a fraudulent behavior such as money laundering, member information, information for a member, or the like are displayed on the LCD 1719, and data read from the IC card 1500 and data input by a player are displayed. The LCD 1719 has a touch panel function, and when the touch panel is operated by the player, a predetermined signal is transmitted to the CPU 1751.

A home button 1722 is provided near the LCD 1719 and is a button for shifting a screen displayed on the LCD 1719 to a predetermined higher-level screen. When the home button 1722 is pressed by a player, an operation of the player is transmitted to the CPU 1751, and the CPU 1751 transmits a command to the LCD control unit 1762 so as to update the display of the LCD 1719 in response to the operation.

An IC card control unit 1763 controls insertion and discharge of the IC card 1500, and writing of the credit data. The IC card control unit 1763 includes an IC card reader and writer (R/W) control unit 1763*a*, an IC card reception and discharge control unit 1763*b*, and an LED control unit 1763*c*. The IC card 1500 can use a so-called contact type card including a module terminal that makes contact with the IC card reader and writer (R/W), and a so-called non-contact type card including an antenna that transmits and receives information in a non-contact manner with the IC card reader and writer (R/W). The IC card reader and writer (R/W) can also adopt a configuration corresponding thereto.

The IC card R/W control unit 1763*a* controls the card unit 1741, thereby updating credit related data (game value information) stored in the IC card 1500. When the IC card 1500 is newly issued, the credit related data corresponding to a settled amount is stored therein. The card unit 1741 includes an antenna unit for reading or writing data from or to the IC card 1500 by NFC or the like.

The card unit 1741 has a function of an IC card reader for reading the information stored in the IC card 1500 and a function of an IC card writer for writing the information to the IC card 1500, and may have any one of the above-described functions as necessary.

The IC card reception and discharge control unit 1763*b* controls reception and discharge of the IC card 1500. When the IC card 1500 is inserted into the card insertion slot 1730 by a player, the IC card is controlled to be retained in the card unit 1741 while the player executes a game. After the credit related data is written to the IC card 1500 at the time of settlement, the IC card 1500 is controlled to be discharged therefrom. When the eject button 1732 is pressed, the IC card 1500 is also discharged.

When the IC card 1500 is newly issued, the IC card 1500 is newly taken out of the card stacker 1742, and then the IC card 1500 is supplied to the card unit 1741 in order to store the credit related data.

The LED control unit 1763*c* performs control so that the LED (the full color LED 1731) provided near the card insertion slot 1730 of the card unit 1741 is turned on and the LED (the red LED 1733) provided near the eject button 1732 is turned on.

A touch unit control unit 1764 controls data transmission and reception associated with a touch operation of the IC card 1500, a mobile phone, a smart phone, or the like. The touch unit control unit 1764 includes a non-contact reader and writer (R/W) control unit 1764*a* and an LED control unit 1764*b*.

The non-contact R/W control unit 1764*a* determines whether the IC card 1500 and the mobile phone approaches a predetermined distance (for example, a touch operation is performed) with the touch unit 1745, and when the IC card 1500 and the mobile phone approaches the predetermined distance, the non-contact R/W control unit 1764*a* acquires a reading result or the like from the touch unit 1745. The touch unit 1745 includes an antenna unit for transmitting and receiving data to and from the IC card 1500 and the mobile phone by NFC or the like.

The touch unit 1745 has a function of an IC card reader for reading information stored in the IC card 1500 and the mobile phone, and a function of an IC card writer for writing information to the IC card 1500 and the mobile phone, and may have any one of the above-described functions as necessary.

The LED control unit 1764*b* controls the LEDs 1746 disposed at four corners of the front surface of the touch unit 1745 and lights the LEDs 1746 at a predetermined timing.

A DSP 1765 receives voice data acquired from microphones 1715 and 1717, performs a predetermined voice process thereon, and transmits the processed voice data to the CPU 1751. The DSP 1765 transmits the received voice data to speakers 1707 and 1709. The DSP 1765 further outputs the received voice to a headphone with respect to an audio terminal connected to a headset, processes the voice received from the microphone, and transmits the processed voice to the CPU 1751. Here, a schematic configuration is illustrated, and illustration of an A/D converter, a D/A converter, an amplifier, or the like is omitted.

A camera control unit 1766 acquires an image of a player or the like captured by the human body detection camera 1713, performs a predetermined image process as necessary, and transmits the processed data to the CPU 1751. The data is transmitted to, for example, the management server 500, a member management server 13, or the like via the server I/F 1755.

The camera control unit 1766 transmits image capturing information captured by the human body detection camera 1713 to the management server 500 or the like in response to an instruction from the management server 500.

[Rolling Program Purchase Process]

In the casino system 100 according to the embodiment, rolling program candidates that can be selected by a member are prepared in advance at a casino side, and the member can select a desired program from the prepared candidates thereof.

Figure 7:
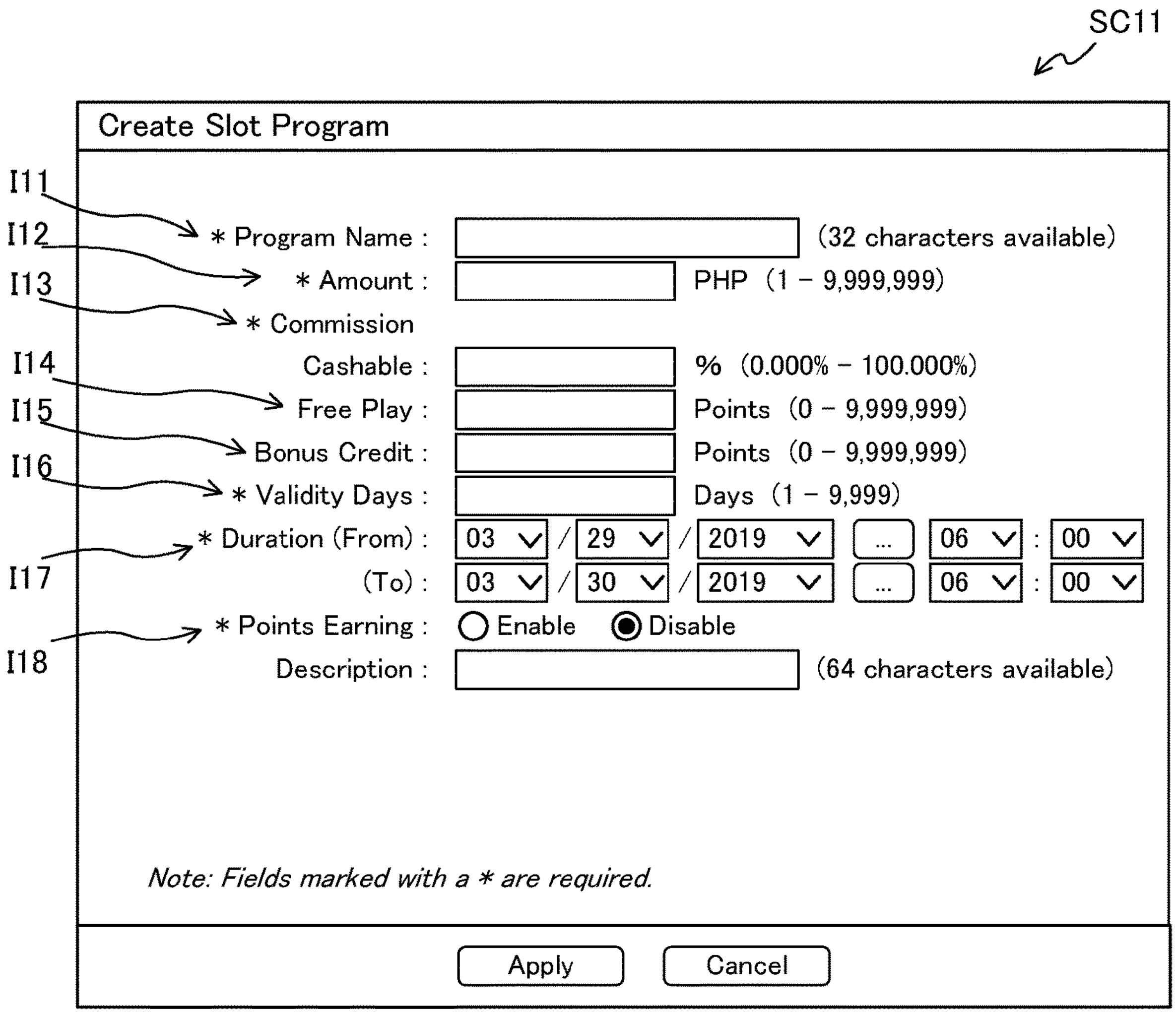
FIG. 7 is a schematic diagram illustrating an input item displayed on a display screen of a reception terminal device at the time of purchasing participation right of a rolling program of the reception terminal device according to an embodiment of the present invention.

When the rolling program candidates are generated in advance, in the management server 500, a setting screen SC11 illustrated in FIG. 7 is displayed on a display device (an LCD 562 (FIG. 2)), and an attendant inputs a necessary item via the setting screen SC11, thereby making it possible to generate the rolling program candidates in advance in the database of the management server 500.

FIG. 7 is a diagram illustrating a display example of a display screen of a terminal device used when the casino side generates the rolling program in advance. As illustrated in FIG. 7, a plurality of items (I11 to I18) are configured to be filled out on the setting screen SC11 for setting the rolling program. The input item I11 (Program Name) is an item for setting a name of the rolling program (Slot program name); the input item I12 (Amount) is an item for setting a purchase amount (Slot program amount) of a dedicated game value (a first game value V1 which is a credit for a rolling program equivalent to a non-negotiation chip used in a table game) to be purchased for starting a program to be set; the input item I13 (Commission Cashable) is an item for setting a ratio (Rebate) with respect to the purchase amount of the game value (the credit) that is returned to the member when the dedicated game value (the first game value V1) is completely used up within a predetermined period (Validity Days) after the start of the rolling program; the input item I14 (Commission Free Play) is an item for setting the number of points for a free play (Free Play Commission Amount) (a third game value V3 which is the number of points that can be used only in the slot machine 1010) to be granted to the member as a privilege when the dedicated game value (the first game value V1) is completely used up within the predetermined period (Validity Days) after the start of the rolling program; the input item I15 (Commission Bonus Credit) is an item for specifying the number of bonus credit points (Bonus Credit Commission Amount) (a fourth game value V4 which is the number of points that can also be used in other services such as eating and drinking at the casino in addition to the slot machine 1010) to be granted to the member when the dedicated game value (the first game value V1) is completely used up within the predetermined period (Validity Days) after the start of the rolling program; the input item I16 (Validity Days) is an item for setting the time when the predetermined period elapses after the start of the rolling program as a validity period of the rolling program (Validity days after program credit is activated); the input item I17 (Duration) is an item for setting a holding period (slot program duration date and time) during which the selected rolling program is held; and the input item I18 (Points Earning) is an item for setting whether or not to grant a separately set point (Enable/Disable).

In the management server 500, a plurality of rolling program candidates (packages) can be generated in advance via the above-described setting screen SC11. The reception terminal device 200 of the reception counter 201 displays information on the plurality of rolling program candidates generated in the management server 500, and can select any one of the candidates in response to a request of a member.

Figure 8:
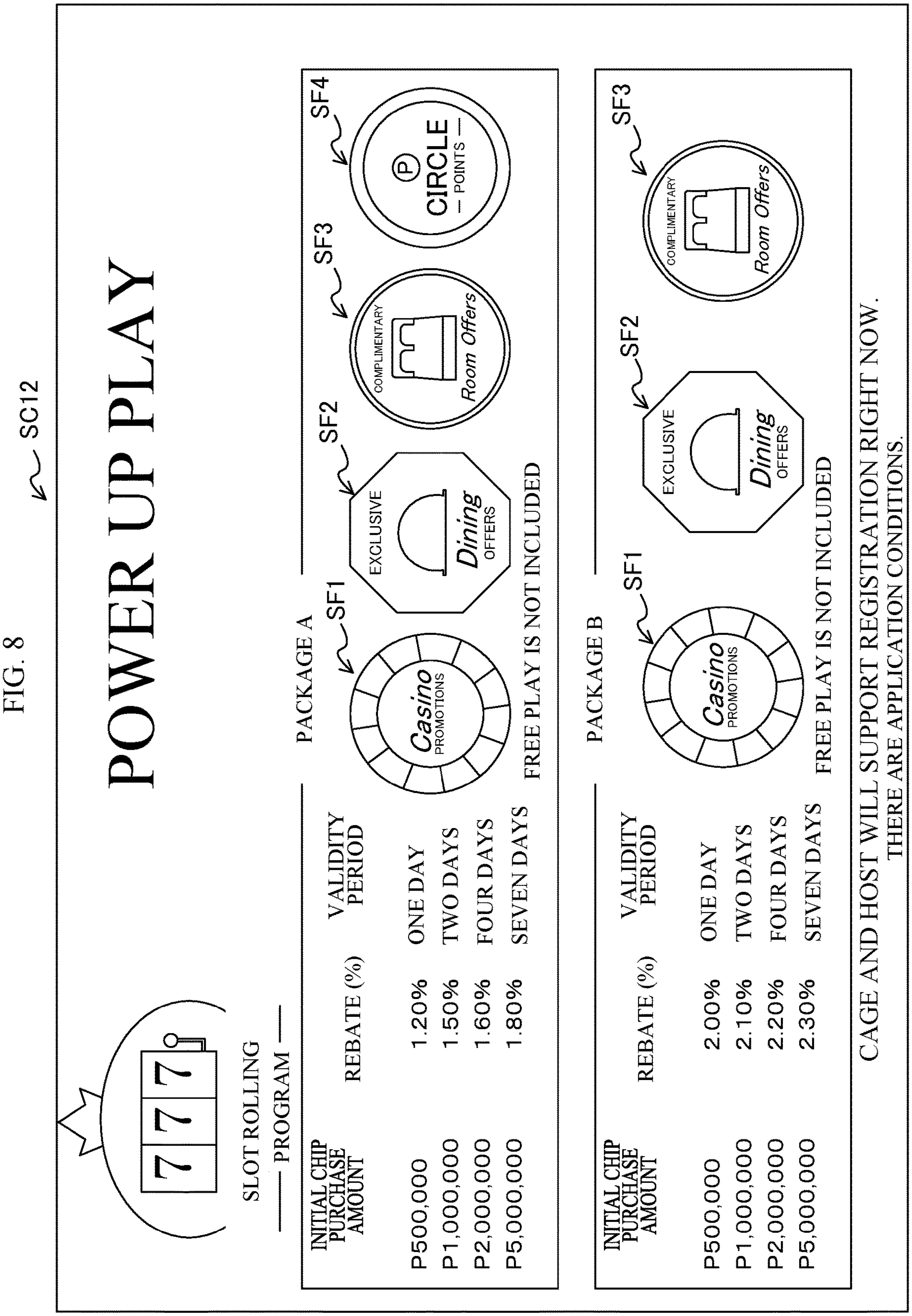
FIG. 8 is a schematic diagram illustrating an introduction screen displayed on the display screen of the reception terminal device at the time of purchasing the participation right of the rolling program of the reception terminal device according to the embodiment of the present invention.

FIG. 8 is a diagram illustrating a display example in a display device of the reception terminal device 200. As illustrated in FIG. 8, the display device of the reception terminal device 200 displays an introduction screen SC12 for displaying the plurality of rolling program candidates generated in the management server 500 as a package A, a package B, or the like.

An attendant can select and operate one rolling program in response to the member's desire. At the time of performing the selection operation, the attendant inputs member information such as a membership number or the like into the reception terminal device 200 by using a member information card shown by the member, whereby it is possible to perform use registration of the rolling program associated with the member. This registration information is transmitted from the reception terminal device 200 to the management server 500, and stored in the management server 500.

Specifically, the introduction screen SC12 as illustrated in FIG. 8 is displayed on the display device of the reception counter 201. That is, as illustrated in FIG. 8, the introduction screen SC12 visually displays the programs (the package A, the package B, . . . ) registered in advance in the management server 500 as the rolling program candidates, and a plurality of privileges SF1, SF2, . . . are set in each package. The privilege is granted to a member when the member purchases the game value dedicated to the rolling program (the first game value V1) and the purchased game value is used up within the predetermined period (Validity Days) after the start of the rolling program. For example, four privileges SF1, SF2, SF3, and SF4 are set in the package A, and three privileges SF1, SF2, and SF3 are set in the package B. These privileges are set according to setting contents of the input items I13 to I15 on the setting screen SC11 illustrated in FIG. 7 (setting items of the privilege to be granted to the member when the first game value is used up within the period). The packages (the package A, the package B, or the like) are configured to be classified according to a combination of the privileges SF1 to SF4.

A plurality of selection options of an initial chip purchase amount (a purchase amount for purchasing the game value for the rolling program) are prepared in each package. For example, in the package A illustrated in FIG. 8, purchase amounts of 500,000 PHP (Philippine Peso), 1,000,000 PHP, 2,000,000 PHP, and 5,000,000 PHP are prepared as the selection options. The validity period (Validity Days) is determined for each purchase amount. A ratio (a rebate) of a credit amount, which is to be returned to the member as the privilege when the purchase amount is used up in the slot machine 1010 within the validity period (Validity Days) set for each purchase amount, is determined.

For example, in the package B illustrated in FIG. 8, purchase amounts of 500,000 PHP, 1,000,000 PHP, 2,000,000 PHP, and 5,000,000 PHP are prepared as the selection options, and the validity period (Validity Days) is determined for each purchase amount. A ratio (a rebate) of a credit amount, which is to be returned to the member as the privilege when the purchase amount is used up in the slot machine 1010 within the validity period (Validity Days) set for each purchase amount, is determined.

The member can determine a package to be selected and a purchase amount of the selected package based upon the validity period (Validity Days) associated with each purchase amount and the rebate information by checking the introduction screen SC12 illustrated in FIG. 8. When the member informs the attendant about the package name and the purchase amount of the desired rolling program at the reception counter 201, the attendant selects any one of the plurality of candidates registered in advance by operating the reception terminal device 200, and performs registration in association with the information (the membership number or the like) stored in the member information card shown by the member. The registration information is transmitted from the reception terminal device 200 to the management server 500 (described later in FIG. 11), and then stored in the management server 500.

Figure 9:
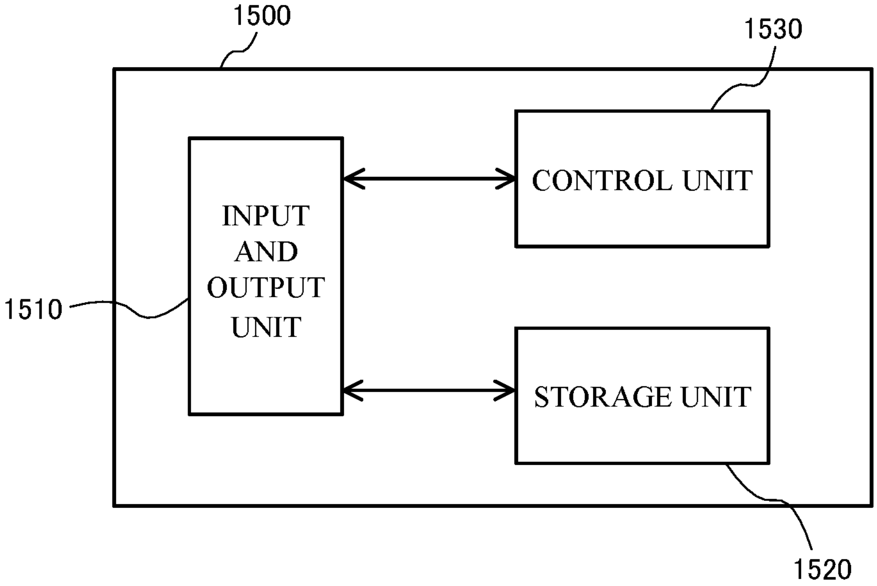
FIG. 9 is a block diagram illustrating a configuration of an IC card according to an embodiment of the present invention.

In the embodiment, while the setting screen SC11 illustrated in FIG. 7 is configured to set the holding period (Slot program duration date and time) during which the rolling program is held, and the rolling program outside this period is configured not to be displayed on the introduction screen SC12 illustrated in FIG. 9, for example, the rolling program candidates within the period and the rolling program candidates outside the period may be displayed to be distinguished therebetween by changing a display color and luminance of a package display of the rolling programs to be the candidates.

[Circuit Configuration of IC Card]

Hereinafter, a circuit configuration of the IC card 1500 will be described with reference to FIG. 7 of the attached drawing. FIG. 9 is a block diagram illustrating the circuit configuration of the IC card 1500 according to the embodiment of the present invention. The IC card 1500 includes: an input and output unit 1510 used as an interface for transmitting and receiving information to and from an information card reading unit in a non-contact manner; a non-volatile storage unit 1520 having a function as a storage unit; and a control unit 1530 having a function as a control unit for controlling the input and output unit 1510 and the non-volatile storage unit 1520.

[Type of Game Value]

FIG. 10 is a conceptual diagram illustrating an area for storing four types of game value information provided in a storage unit 1520 of the IC card 1500 by type. A first area is a first storage area AR1 for storing a game value (credit data for a rolling program) purchased by a player to participate in the rolling program, and the game value stored in the first storage area AR1 (the first game value) cannot be converted into cash by the cashier 401 in principle and is only permitted to be used in a game by the slot machine 1010 (there is a restriction on the use of the game value information). Prize money, which is generated in the game by reading out first game value information from the first storage area AR1 and providing the read first game value information to a BET of the game, is stored in a second storage area AR2. Information representing a type and amount of the game value (the first game value V1) stored in the first storage area AR1 is referred to as the first game value information.

A second area is the second storage area AR2 in which a game value corresponding to any amount of money deposited by a player with cash can be stored and further cash conversion can be performed by a cashier (no restriction on the use of the game value information). The second storage area AR2 can write a game value (credit data) corresponding to a dividend obtained by playing a game in the slot machine 1010. Information representing a type and amount of a game value (a second game value V2) stored in the second storage area AR2 is referred to as second game value information. In principle, both the first game value information and the second game value information are treated as a cash equivalent.

A third area is a third storage area AR3 in which depositing cannot be performed by a player, and a game value (credit data) granted by promotion by game facilities such as a casino or the like, use of facilities, game playing, or the like can be stored. The game value (a third game value) stored in the third storage area AR3 cannot be converted into cash by the cashier 401 in principle, and is only permitted to be used in a game by the slot machine 1010 (a so-called free play). Information representing a type and amount of the game value (the third game value V3) stored in the third storage area AR3 is referred to as third game value information.

When the game value is read out from the third storage area AR3 and a fourth storage area AR4 which will be described later and used for a BET of a game, a prize generated in the game is stored in the second storage area AR2. That is, the third game value V3 and the fourth game value V4, which cannot be directly converted into cash, are stored in the storage area AR2 as the second game value V2 after being provided to the game, and then can be converted into cash thereafter.

A fourth area is the fourth storage area AR4 in which depositing cannot be performed by a player, and a game value (credit data) granted by promotion by game facilities such as a casino or the like, use of facilities, game playing, or the like can be stored (no restriction on the use of the game value information). The game value (the fourth game value V4) stored in the fourth storage area AR4 cannot be converted into cash by the cashier 600 in principle, and is also permitted to be used for various services in facilities in addition to the use in the game (a so-called bonus credit). It is stored in the fourth storage area AR4. Information representing an amount of the game value stored in the fourth storage area AR4 is referred to as fourth game value information.

In principle, both the third game value information and the fourth game value information are not treated as a cash equivalent.

In the casino system 100 of the embodiment, these four types of game values are used, and according thereto, the management server 500 is also configured to be able to store the game values for each type. That is, when the management server 500 stores the game value (the credit data) in the storage unit (the RAM 553 and the database 560), the management server 500 is configured to store the game value in the storage area corresponding to each type of the first game value, the second game value, the third game value, and the fourth game value.

[Credit Insertion Process]

A credit insertion process with respect to the slot machine 1010 will be described with reference to FIG. 11.

First, when a player inserts a member information card (the IC card 1500) into the card insertion slot 1730 of the SMIB device 1700 (FIG. 4) (S61), the IC card control unit 1763 of the SMIB device 1700 (FIG. 6) reads an entire amount of credit data (that is, credit data owned by a member) stored in the member information card, stores the read entire amount thereof in the RAM 1753 (FIG. 6) (S62), and transmits the credit data as input information (S64) to the slot machine 1010 (S63). As a method for reading the credit data from the member information card, instead of reading the credit data stored in the member information card (the IC card 1500), the credit data owned by the member stored in a member account of the management server 500 in association with member information of the member information card may be acquired from the management server 500. When the credit data stored in the member information card exceeds an upper limit of an amount of money that can be stored therein, which is set in the slot machine 1010 in advance, the credit data corresponding to the upper limit thereof is configured to be read from the member information card. The credit data read by the SMIB device 1700 is erased from the member information card.

Here, as described above in FIG. 10, the storage unit 1520 (FIG. 9) of the member information card (the IC card 1500) includes the storage areas AR1 to AR4 that individually correspond to four types of game values (the credit data), and the first game value to the fourth game value are respectively stored in the corresponding storage areas. The storage unit of the management server 500 (the member account) is also configured in the same manner. Therefore, the credit data read out from the member information card (or the storage unit of the management server 500) in step S62 may include all four types of game values. When reading out the credit data from the member information card or the management server 500, the SMIB device 1700 determines, from the storage area, the type of credit data (any one of the first game value to the fourth game value) stored in the storage area, associates information (game value type information) representing the determined type thereof with the read credit data, and stores the information associated therewith in the RAM 1753 of the SMIB device 1700 as the first to fourth game value information.

The slot machine 1010 receiving the input information including the first to fourth game value information (S64) stores the credit data (the inserted amount of money) in the received input information (S64) in a storage area (described later) corresponding to each of the first to fourth game values of the storage unit in the game controller 70 (S65).

Next, in the slot machine 1010, an amount of money, which is specified by a player using the credit data stored in the storage unit, is BET on a game, and one game is executed (S66). In the slot machine 1010, when the player obtains an advantageous game result in this game, credit data of an amount corresponding to a prize acquired by the player is added to a credit balance stored in the storage unit of the slot machine 1010 according to a predetermined rule which will be described later, and on the other hand, when the player does not obtain the advantageous game result in this game, a process of subtracting an amount of BET from the stored credit balance is performed.

In this manner, the credit balance of the player changes for each game, and every time one game is completed, the slot machine 1010 transmits, to the SMIB device 1700, a game value (the first game value and the second game value) that can be treated as cash in the credit balance stored in the storage unit as balance information (S68) (S67). When transmitting the credit balance (the balance information (S68)) thereto, the slot machine 1010 determines whether or not the game ends (S69).

Next, when the player operates the CASHOUT button, the slot machine 1010 ends the game (S69: YES). On the other hand, when the player does not operate the CASHOUT button, the slot machine 1010 does not end the game (S69: NO) and executes the next game.

In the SMIB device 1700, the balance information (S68) transmitted from the slot machine 1010 every time one game ends is stored in the RAM 1753 according to a predetermined rule (S70). Specifically, as described above, in the SMIB device 1700, the entire credit balance of the member is read from the member information card (or the management server 500) and transmitted to the slot machine 1010, and in the slot machine 1010, the transmitted read amount is stored in a storage area corresponding to each type of credit data.

Since the read credit data transmitted to the slot machine 1010 is stored in the storage area corresponding to each type thereof (the first to fourth game values), the credit data is provided to a BET for each type according to a predetermined usage rule (for example, a rule regarding the order of using game values in which game values (credits) are provided to a BET in the order of the third game value, the fourth game value, the first game value, and the second game value) in the game controller 70 of the slot machine 1010. Specifically, for example, when credit data remains in the storage area of the game controller 70 in which the third game value is stored, the credit data is preferentially read out and provided to the BET. On the other hand, when the credit data (the third game value) does not remain in the storage area, it is determined whether or not the credit data remains in the storage area of the game controller 70 in which the fourth game value is stored, and when the credit data remains therein, the credit data (the fourth game value) is preferentially read out and provided to the BET. On the other hand, when the credit data (the fourth game value) does not remain in the storage area, it is determined whether or not the credit data remains in the storage area in the game controller 70 in which the first game value is stored, and when the credit data remains therein, the credit data (the first game value) is preferentially read out and provided to the BET. On the other hand, when the credit data (the first game value) does not remain in the storage area, it is determined whether or not the credit data remains in the storage area in the game controller 70 in which the second game value is stored, and when the credit data remains therein, the credit data (second game value) is preferentially read out and provided to the BET.

A credit balance corresponding to a result of the game is stored in a storage area determined according to a storage rule predetermined in the game controller 70. Specifically, when the credit data used for the BET is the first game value, a prize generated as a result of the game by the BET is stored in the storage area of the corresponding game controller 70 as the second game value. Since a prize generated in the game in which the third and fourth game values are provided to the BET is a type of game value in which the third and fourth game values are not treated as cash, the prize generated therein is stored in the storage area of the corresponding game controller 70 as the game values (the third and fourth game values) similar to the read game values.

Next, the first to fourth game values (the credit data) stored in the game controller 70 of the slot machine 1010 are added up and transmitted to the SMIB device 1700 every time one game ends. Therefore, it is difficult for the SMIB device 1700 receiving the credit balance (the balance information (S68)) to individually grasp a type of the credit balance. Therefore, in the embodiment, the balance information (S68) includes a BET amount of each game and a prize amount generated as a result of the game, and then the balance information (S68) is transmitted from the slot machine 1010 to the SMIB device 1700. Further, the SMIB device 1700 is configured to store the usage rule of the game value (the credit data) in the slot machine 1010 in the RAM 1753 in advance, grasp a type of credit used (one of the first to fourth game values) or a type of credit amount granted by the generation of the prize (one of the first to fourth game values) based on a difference between the balance information (S68) transmitted from the slot machine 1010 for each game and the balance information (S68) transmitted one game before and stored in the RAM 1753, and determine a breakdown of the balance (each amount of the first to fourth game values) based on the grasped result.

That is, the slot machine 1010 determines which type of credit data in a credit balance is first provided to a BET according to a usage rule, and the game controller 70 uses the credit balance for the BET according to the usage rule. Specifically, in the storage unit provided in the game controller 70, in the same manner as that of the storage unit 1520 of the IC card 1500 (FIGS. 9 and 10), the storage area is divided for each type of credits (the first game value to the fourth game value), and the credit data read from the IC card 1500 (the member information card or the non-member information card) in the SAM device 1700 is transmitted to the slot machine 1010 together with information (the first game value information to the fourth game value information) representing the type thereof (the first game value to the fourth game value). The game controller 70 of the slot machine 1010 stores the game value information (the first game value information to the fourth game value information) received from the SAM device 1700 in the corresponding storage area. Accordingly, the game controller 70 can read the game value information (the credit data) for each type stored in each storage area from the corresponding storage area and can provide the read game value information to the BET of the game according to the predetermined rule.

For example, as described above in FIG. 10, the first game value V1 (the credit data stored in the first storage area AR1 of the IC card 1500) is the credit for the rolling program purchased by the player to participate in the rolling program (the first game value), and this first game value cannot be converted into cash by the cashier 401 in principle, and is only permitted to be used in the game by the slot machine 1010. That is, there is the restriction on the use of the game value. The prize money, which is generated in the game by reading the first game value information representing the first game value and providing the first game value information to the BET of the game, is treated as the second game value V2. That is, the prize money is stored as the second game value V2 (the credit data) in the second storage area 2, in which the second game value is to be stored, of the first to fourth storage areas provided in the game controller 70.

As described above, the game controller 70 reads out a credit balance according to the predetermined usage rule and provides the read credit balance to a BET, and stores a prize (a credit) generated as a result of the game in a determined storage area according to the determined storage rule. Next, the game controller 70 transmits a result of adding up these processing results for all the storage areas to the SMIB device 1700 for each game as the balance information (S68).

The SMIB device 1700 can store the credit balance that changes for each game in the slot machine 1010 for each type thereof (S70), based on the balance information (S68) transmitted from the slot machine 1010 (the game controller 70).

In this manner, when a player performs a card discharge operation after a balance storage process is completed in the SMIB device 1700, the SMIB device 1700 transmits information stored in the RAM 1753 to the management server 500, writes the information to the member information card, and then discharges the member information card (S71).

[Balance Storage Process]

Hereinafter, the embodiment describes a process of storing the balance information (S68) in the RAM 1753 of the SMIB device 1700.

As illustrated in FIG. 12, the RAM 1753 of the SMIB device 1700 stores: a deposit amount (a total and a breakdown) deposited by inserting the member information card into the SMIB device 1700 at the end of each game specified by a game number; a prize amount, a BET amount, and a total balance (the sum of all types of game values (the first to fourth game values) stored in the game controller 70) transmitted from the slot machine 1010 and provided in the balance information (S68); a breakdown of the balance calculated based on the balance transmitted from slot machine 1010 (a breakdown of the (that is, current) first to fourth game values after a game this time calculated from a total balance received this time and a breakdown of the first to fourth game values after a previous game calculated from a total balance received the previous time); a game value that can be converted into cash and an amount thereof in the calculated current balance breakdown; and a game value that can be paid out by a hand pay process (described later) and an amount thereof in the calculated current balance breakdown.

Specifically, in FIG. 12, when a player inserts the member information card into the SAM device 1700, the SAM device 1700 reads out an entire amount (total 1,700,000 PHP) of all types of game values (for example, the first game value V1 is 1,000,000 PHP (Philippine peso), the second game value V2 is 500,000 PHP, the third game value V3 is 100,000 PHP, and the fourth game value V4 is 100,000 PHP) stored in the management server 500 in association with the member information card and a member who owns the member information card, and stores the entire amount thereof in the RAM 1753.

When the deposit amount includes the first game value V1 which is the credit for the rolling program, the SMIB device 1700 stores contents of the rolling program (a program ID, a period thereof, or the like) stored in the management server 500 in association with a member information card and a member who owns the member information card in the RAM 1753 in association with the deposit amount.

In this state, the SMIB device 1700 transmits all the deposit amounts stored in the RAM 1753 to the slot machine 1010. In this state, in the slot machine 1010, one game (a game number "1") is executed by allowing the player to perform a BET operation. A BET amount in this game is 100,000 PHP, a prize is not generated, a total balance that reflects a result of the game (a total of all the game values (the first to fourth game values) after the game) is 1,600,000 PHP, and these pieces of information are transmitted from the slot machine 1010 to the SMIB device 1700 as the balance information (S68), and are stored in the RAM 1753 of the SMIB device 1700 in association with the game number "1" (FIG. 12).

The SMIB device 1700 further calculates, based on these pieces of information obtained from the slot machine 1010, a breakdown of the total balance (each amount of the first game value V1, the second game value V2, the third game value V3, and the fourth game value V4 in the total balance), and stores the calculated breakdown thereof in the RAM 1753 in association with the game number "1". Specifically, as a breakdown of a deposit amount deposited through the member information card before the game specified by the game number "1", the first game value V1 is 1,000,000 PHP, the second game value V2 is 500,000 PHP, the third game value V3 is 100,000 PHP, and the fourth game value V4 is 100,000 PHP, which are stored in the RAM 1753 at the time of depositing each amount, and a breakdown of each game value is calculated based on these pieces of information and the total balance of 1,600,000 PHP obtained from the slot machine 1010 after the game. This calculation process uses the above-described credit usage rule and storage rule in the slot machine 1010, which are stored in advance in the RAM 1753. That is, the SAM device 1700 can determine that only the third game value V3 is reduced by a BET amount as the breakdown of the total balance of 1,600,000 PHP after the game specified by the game number "1", based on the BET amount (100,000 PHP) of the game specified by the game number "1" and the usage rule indicating that the credits in the slot machine 1010 are used for the BET in descending order of priority from the third game value V3.

That is, the SMIB device 1700 stores each amount of the game values in the RAM 1753 as a balance breakdown based on information indicating that the total balance at the start of the game specified by the game number "1" (the deposit amount deposited through the member information card) is 1,700,000 PHP, the BET amount (100,000 PHP) can be used within the amount of the third game value (100,000 PHP) such that 0 PHP is obtained by subtracting the BET amount from only the third game value, and other game values (the first game value V1 is 1,000,000 PHP, the second game value V2 is 500,000 PHP, and the fourth game value is 100,000 PHP) do not change.

The SMIB device 1700 can determine that only the second game value V2 (500,000 PHP), which has no restriction on the use thereof and can be directly treated as cash, in the balance breakdown is a game value that can be converted into cash. The SMIB device 1700 determines, as a hand pay amount that can be paid out by the hand pay, the game values excluding the third game value V3 and the fourth game value V4 that cannot be treated as cash (the first game value V1 (1,000,000 PHP) and the second game value V2 (500,000 PHP)) in this balance breakdown. The first game value V1 is a game value acquired by purchasing the rolling program, and the amount of the first game value V1 is determined by the SMIB device 1700, such that a balance of the first game value V1 can be transmitted to the management server 500 as a breakdown of the hand pay amount in the hand pay process.

In this state, the player further performs the BET operation to play the next game (a game number "2"), and when this game ends, the balance information (S68) is transmitted from the slot machine 1010 to the SMIB device 1700.

A BET amount in this game is 100,000 PHP, a prize of 500,000 PHP is generated, a total balance that reflects a result of the game (a total of all the game values (the first to fourth game values) after the game) is 2,000,000 PHP, and these pieces of information are transmitted from the slot machine 1010 to the SMIB device 1700 as the balance information (S68), and are stored in the RAM 1753 of the SMIB device 1700 in association with the game number "2" (FIG. 12).

The SMIB device 1700 calculates a breakdown of the total balance (each amount of the second game value V1, the second game value V2, the third game value V3, and the fourth game value V4 in the total balance) based on these pieces of information obtained from the slot machine 1010, and stores the calculated breakdown thereof in the RAM 1753 in association with the game number "2". Specifically, since there is no new deposit from the information card or the like in the game specified by the game number "2", the breakdown of each game value is calculated based on the amount of each game value after the game specified by the game number "1" stored in the RAM 1753 (that is, before the start of the game specified by the game number "2"), the total balance thereof, and the total balance of 2,000,000 PHP earned from the slot machine 1010 after this game. This calculation process uses the above-described credit usage rule and storage rule in the slot machine 1010, which are stored in advance in the RAM 1753. That is, the SMIB device 1700 can determine, as a breakdown of the total balance of 2,000,000 PHP after the game specified by the game number "2", that the fourth game value V4 decreases by the BET amount (100,000 PHP) and the second game value V2 increases by the amount of the generated prize (500,000 PHP), based on the BET amount (100,000 PHP) of the game specified by the game number "2" and the usage rule indicating that the credits in the slot machine 1010 are used for the BET in descending order of priority from the third game value V3. In the embodiment, when the third game value V3 or the fourth game value V4 provided for promotion is used for a BET on a game of the slot machine 1010, a prize generated in the game is treated as the second game value V2.

That is, the SMIB device 1700 stores each amount of the game values in the RAM 1753 as a balance breakdown based on information indicating that the total balance at the start of the game specified by the game number "2" (the balance of the previous game) is 1,600,000 PHP, the BET amount (100,000 PHP) cannot be used within the amount of the third game value (0 PHP) such that 0 PHP is obtained by subtracting the BET amount from the fourth game value V4 having the second highest usage priority after the third game value V3, the second game value V2 becomes 1,000,000 PHP by adding the prize amount (500,000 PHP) obtained by the generation of the prize, and other game values (the first game value V1 is 1,000,000 PHP and the third game value is 0 PHP) do not change.

The SMIB device 1700 can determine that only the second game value V2 (1,000,000 PHP), which has no restriction on the use thereof and can be directly treated as cash, in the balance breakdown is a game value that can be converted into cash. The SMIB device 1700 can determine, as a hand pay amount that can be paid out by the hand pay, the game values excluding the third game value V3 and the fourth game value V4 that cannot be treated as cash (the first game value V1 (1,000,000 PHP) and the second game value V2 (1,000,000 PHP)) in this balance breakdown.

In this state, the player further performs the BET operation to play the next game (a game number "3"), and when this game ends, the balance information (S68) is transmitted from the slot machine 1010 to the SMIB device 1700.

A BET amount in this game is 200,000 PHP, a prize is not generated, a total balance that reflects a result of the game (a total of all the game values (the first to fourth game values) after the game) is 1,800,000 PHP, and these pieces of information are transmitted from the slot machine 1010 to the SMIB device 1700 as the balance information (S68), and are stored in the RAM 1753 of the SMIB device 1700 in association with the game number "2" (FIG. 12).

The SMIB device 1700 calculates a breakdown of the total balance (each amount of the second game value V1, the second game value V2, the third game value V3, and the fourth game value V4 in the total balance) based on these pieces of information obtained from the slot machine 1010, and stores the calculated breakdown thereof in the RAM 1753 in association with the game number "3". Specifically, since there is no new deposit from the information card or the like in the game specified by the game number "3", a breakdown of each game value is calculated based on the amount of each game value after the game specified by the game number "2" stored in the RAM 1753 (that is, before the start of the game specified by the game number "3"), the total balance thereof, and the total balance of 1,800,000 PHP earned from the slot machine 1010 after this game. This calculation process uses the above-described the credit usage rule and storage rule in the slot machine 1010, which are stored in advance in the RAM 1753. That is, the SAM device 1700 can determine, as a breakdown of the total balance of 1,800,000 PHP after the game specified by the game number "3", that the first game value V1 decreases by the BET amount (200,000 PHP) and becomes 800,000 PHP, based on the BET amount (200,000 PHP) of the game specified by the game number "3" and the usage rule indicating that the credits in the slot machine 1010 are used for the BET in descending order of priority from the third game value V3.

That is, the SAM device 1700 stores each amount of the game values in the RAM 1753 as a balance breakdown based on information indicating that the total balance at the start of the game specified by the game number "3" (the balance of the previous game) is 2,000,000 PHP, the BET amount (200,000 PHP) cannot be used within the amount of the third game value (0 PHP) and cannot be used within the amount of the fourth game value having the second highest priority (0 PHP), 800,000 PHP is obtained by subtracting the BET amount from the first game value V1 having the third highest priority, and the rest of game values (the second game value V2 is 1,000,000 PHP) does not change.

The SAM device 1700 can determine that only the second game value V2 (1,000,000 PHP), which has no restriction on the use thereof and can be directly treated as cash, in the balance breakdown is a game value that can be converted into cash. The SAM device 1700 can determine, as a hand pay amount that can be paid out by the hand pay, the game values excluding the third game value V3 and the fourth game value V4 that cannot be treated as cash (the first game value V1 (800,000 PHP) and the second game value V2 (1,000,000 PHP)) in this balance breakdown.

As described above, in the game specified by the game number "3", the first game value V1 having the highest priority following the third game value V3 and the fourth game value V4 is used for the BET in a state where the third game value V3 and the fourth game value V4 are completely used. As described above, the first game value V1 is the credit granted by the casino in exchange for the purchase of the right to participate in the rolling program, and when a type of rolling program selected by the member is, for example, a rolling program purchased with a purchase amount of 1,000,000 PHP of the package A illustrated in FIG. 8, the amount of credit to be granted (the amount of the first game value V1) is 1,000,000 PHP, such that when the first game value V1 is used up by a deadline of the rolling program, predetermined privileges SF1 to SF4 (FIG. 8) are granted to the member.

Specifically, contents of the participation right of the purchased rolling program are stored in the member information card (the IC card 1500) owned by a member and a member account on the management server 500 associated with the member. Next, when the member inserts the member information card into the slot machine 1010 (the SAM device 1700), the SAM device 1700 reads the contents of the purchased rolling program as well as the credit data (the first game value V1 to the fourth game value V4), and stores the read contents thereof and credit data in the RAM 1753 (S61 (FIG. 11)).

While referring to an expiration date (Validity Days) of the first game value V1 purchased as the participation right of the rolling program based on the contents of the rolling program stored in the RAM 1753, the SAM device 1700 subtracts an amount corresponding to a BET from the first game value V1 based on a usage rule predetermined each time the BET is performed. Next, when the first game value V1 is completely used before the expiration date (Validity Days), achievement information of the rolling program is transmitted to the management server 500 together with the member information, and information indicating that the first game value V1 is completely used is written to the inserted member information card. The management server 500 grants a predetermined privilege to the member.

After playing the game a plurality of times, the player further performs the BET operation to play the next game (a game number "x"), and when this game ends, the balance information (S68 (FIG. 11)) is transmitted from the slot machine 1010 to the SAM device 1700.

Figure 11:
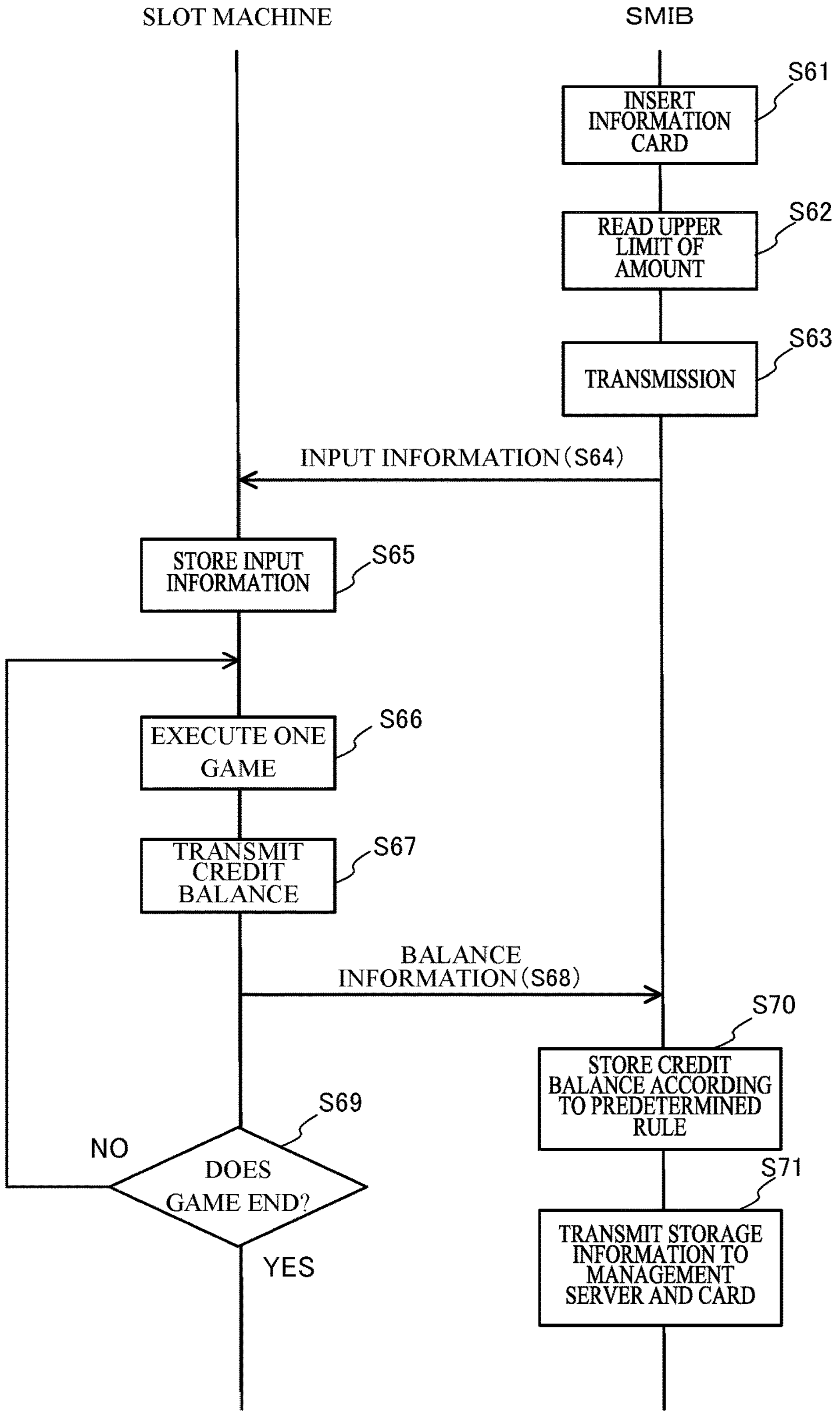
FIG. 11 is a flowchart illustrating a transmission process of balance information in the slot machine and the SMIB device according to the embodiment of the present invention.

A BET amount in this game is 100,000 PHP, a generated prize is 1,000,000 PHP, a total balance that reflects a result of the game (a total of all the game values (the first to fourth game values) after the game) is 2,200,000 PHP, and these pieces of information are transmitted from the slot machine 1010 to the SMIB device 1700 as the balance information (S68 (FIG. 11)), and are stored in the RAM 1753 of the SMIB device 1700 in association with the game number "x" (FIG. 11).

The SMIB device 1700 calculates a breakdown of the total balance (each amount of the second game value V1, the second game value V2, the third game value V3, and the fourth game value V4 in the total balance) based on these pieces of information obtained from the slot machine 1010, and stores the calculated breakdown thereof in the RAM 1753 in association with the game number "x". Specifically, since there is no new deposit from the information card or the like in the game specified by the game number "x", a breakdown of each game value after the game specified by the game number "x" is calculated in the same manner as those of the above-described game numbers "1" to "3" based on the amount of each game value after the game specified by the game number "x−1" stored in the RAM 1753 (that is, before the start of the game specified by the game number "x"), the total balance thereof, and the total balance of 2,200,000 PHP earned from the slot machine 1010 after this game.

As a result of this calculation, when the first game value V1 becomes 500,000 PHP, the second game value V2 becomes 1,700,000 PHP, the third game value V3 becomes 0 PHP, and the fourth game value V4 becomes 0 PHP, the SMIB device 1700 stores the results of this calculation in the RAM 1753 as a "balance breakdown (calculation)" as the amount of each game value corresponding to the game number "x". The second game value V2 of these game values is stored in the RAM 1753 as a cashable amount. In these game values, an amount of the first game value V1, an amount of the second game value V2, and a total amount (2,200,000 PHP) thereof are stored in the RAM 1753 as a hand pay amount. The hand pay amount (the total amount) including this breakdown (the amount of the first game value V1 and the amount of the second game value V2) is included in hand pay information S24 (described later in FIG. 13) and transmitted to the management server 500 in response to a reset operation of the slot machine 1010 by an attendant in the casino. As described above, in preparation for the case in which the slot machine 1010 is reset by the hand pay process, the amount of the first game value V1 is stored in the RAM 1753 as the hand pay amount, and the amount of the first game value V1 is transmitted to the management server 500 in the hand pay process (at the time of resetting the slot machine 1010), such that the management server 500 can update the amount of the first game value V1 at the time of the reset operation thereof as a member balance. That is, as a balance when the hand pay is generated, the amount of the first game value V1, which is used in the rolling program and has the restriction on the use thereof such that cash conversion cannot be directly performed, is also grasped by the management server 500 and reflected in the member account. Accordingly, for example, it is possible to prevent occurrence of errors in which when the reset operation of the slot machine 1010 is performed, the first game value V1 is determined as 0 PHP on the side of the management server 500 even though the first game value V1 remains such that it is mistakenly determined that the rolling program is achieved, or the sum of the first game value V1 and the second game value V2 is transmitted to the management server 500 such that the amount of the first game value V1 becomes unknown.

[Hand Pay Process]

The hand pay process in the casino system 100 will be described with reference to FIG. 13.

Figure 14:
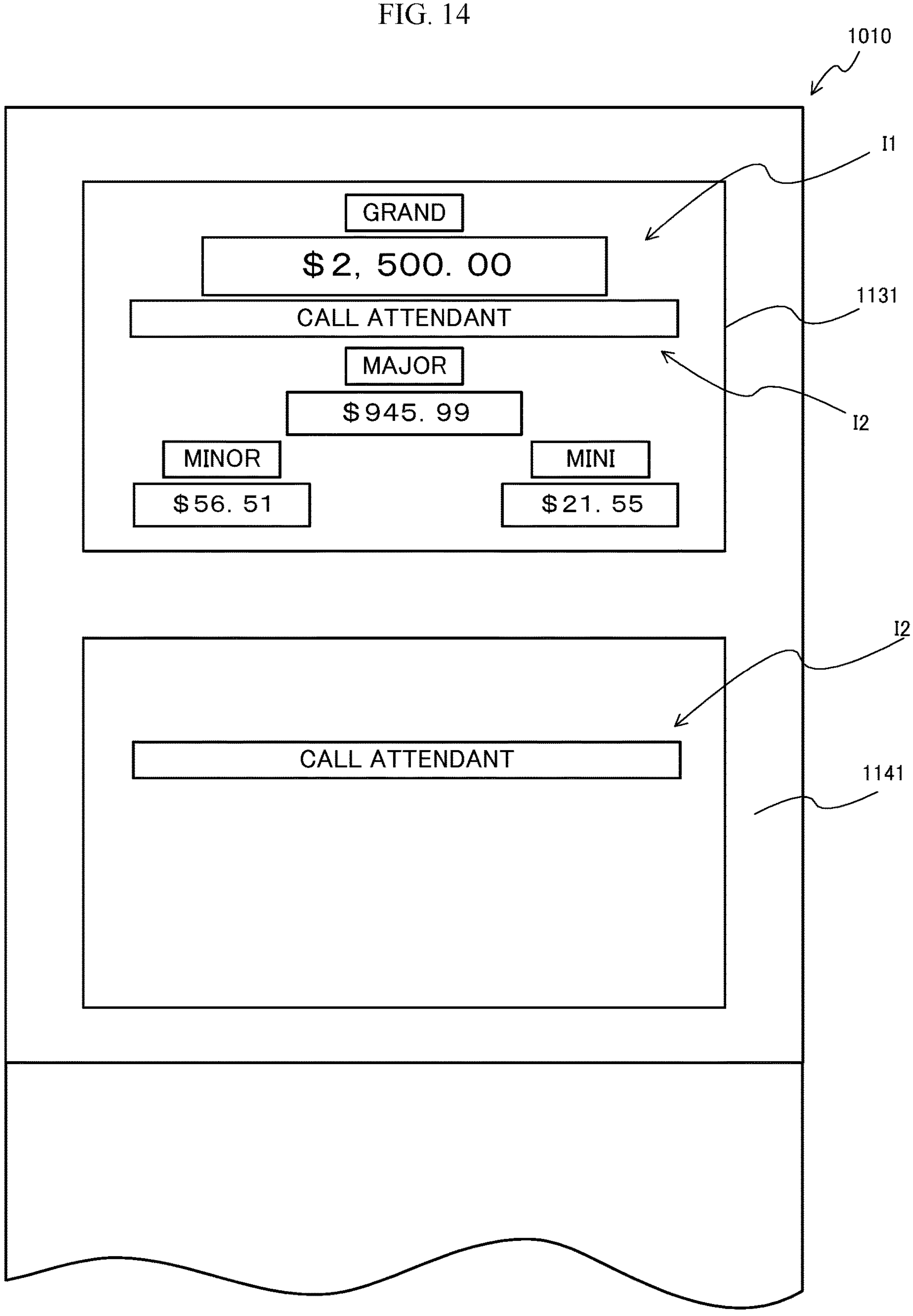
FIG. 14 is a schematic diagram illustrating a display example in the slot machine at the time of the generation of the hand pay according to the embodiment of the present invention.

First, when a prize of a predetermined amount or more such as a jackpot or the like is generated in the slot machine 1010 (S11), the slot machine 1010 causes a display unit thereof (for example, the upper image display panel 1131 and the lower image display panel 1141) to perform a display for urging an attendant to be called (S12). A display example in this case is illustrated in FIG. 14. As illustrated in FIG. 14, a prize amount I1 is displayed on the upper image display panel 1131, and the upper image display panel 1131 and the lower image display panel 1141 include a display 12 formed of characters or the like that urges the attendant to be called.

At this time, the slot machine 1010 notifies the SMIB device 1700 that a hand pay is generated (S12). The SMIB device 1700 receiving the notification transmits, to the hand pay terminal device 600 and the management server 500, hand pay generation information including a generation cause of the hand pay (for example, a prize of a predetermined amount or more is generated), identification information of the slot machine 1010, and member information of a player playing a game in the slot machine 1010 at this time (S13). When a member player plays a game on the slot machine 1010, the member information card is inserted into the card insertion slot 1730 (FIG. 4) of the slot machine 1010 (the SMIB device 1700), and the slot machine 1010 (the SMIB device 1700) reads member information of the player recorded on the inserted member information card, such that the hand pay generation information can include the member information of the member who is playing the game.

The hand pay terminal device 600 and the management server 500 store the received hand pay generation information (S14 and S15).

When the player calls an attendant in response to the display of the slot machine 1010, the attendant goes to the slot machine 1010 and confirms the generation cause of the hand pay. For example, when a prize of a predetermined amount or more is generated, the attendant confirms legitimacy of the generation of the hand pay by confirming a stop mode (a symbol arrangement state) of the pseudo reels 1151 to 1155 of the slot machine 1010 (S16).

When the legitimacy thereof is confirmed, the attendant moves from the slot machine 1010 to the hand pay terminal device 600 (S102), and issues a hand pay electronic slip by operating the hand pay terminal device 600 (S17). In this case, the hand pay terminal device 600 already receives the hand pay generation information (S13) from the SMIB device 1700 of the slot machine 1010, such that the hand pay electronic slip can be displayed on the display device of the hand pay terminal device 600 based on amount information in the hand pay generation information (S13).

Specifically, when the identification information (for example, a unit number) of the slot machine 1010 in which the hand pay is generated is input to the hand pay terminal device 600, the hand pay terminal device 600 reads out the hand pay generation information (S13) received from the slot machine 1010 corresponding to the input identification information, and displays the electronic slip displaying the amount on the display device based on the generation information. At this time, the hand pay terminal device 600 assigns an electronic slip number unique to the electronic slip and issues an electronic slip associated with the number. The member information in the hand pay generation information (S13) is associated with this electronic slip. After confirming contents of the displayed electronic slip, the attendant performs a report process S18 to a manager by operating the hand pay terminal device 600. In the embodiment, the generation information (S13) transmitted from the SMIB device 1700 to the hand pay terminal device 600 includes the credit balance of the slot machine 1010 in which the hand pay is generated and the amount paid to the player by the hand pay process (the hand pay amount). Alternatively, the generation information (S13) may not include the hand pay amount. In this case, when issuing the hand pay electronic slip in the hand pay terminal device 600 (S17), the attendant may visually check the credit balance of the slot machine 1010 and input the credit balance thereof into the hand pay terminal device 600.

In the report process S18, when the attendant operates the hand pay terminal device 600 and inputs a report instruction, the hand pay terminal device 600 transmits report information to the management server 500 (S19). This report information includes the identification information of the slot machine 1010 in which the hand pay is generated, the member information of the player playing the game in the slot machine 1010 when the hand pay is generated, the hand pay amount, and the electronic slip number. These pieces of information are transmitted from the SMIB device 1700 to the hand pay terminal device 600 as the generation information (S13) when the hand pay is generated.

When the management server 500 receives the report information (S13), an administrator (a manager) confirms report contents and performs an approval process (S20). In this approval process (S20), the administrator determines legitimacy of the report information (S19) based on the hand pay generation information (S13 and S15) recorded at the time of receiving the hand pay generation information (S13)

and the report information (S19) transmitted from the hand pay terminal device 600 by the attendant, and when the report contents match, the administrator determines that the report information is legitimate and performs approval thereof. The approved report information (S19) is recorded in the management server 500 as approved information together with the already received generation information (S13). When the approval process (S20) is performed in this manner, approval information (S21) is transmitted from the management server 500 to the hand pay terminal device 600.

When confirming an approval result on the display device of the hand pay terminal device 600, the attendant moves to the slot machine 1010 in which the hand pay is generated (S103), and operates the reset key switch 1019 of the slot machine 1010 to reset credit amount data stored in the game controller 70 of the slot machine 1010 (S22). When a credit cancellation process is performed by operating the reset key switch 1019, the slot machine 1010 notifies the SMIB device 1700 of the credit cancellation process and a cancellation amount (a credit balance when the reset key switch 1019 is operated) as erasure information (S23). The SMIB device 1700 receiving the notification from the slot machine 1010 transmits, to the management server 500, hand pay information S24 including the cancellation amount, the identification number of the slot machine 1010 on which the reset key switch 1019 is operated, the member information of the player playing the game in the slot machine 1010 at this time (the member information read from the member information card being inserted into the card insertion slot 1730 (FIG. 4)), and the hand pay amount described in FIG. 12 (the amount of the first game value V1, the amount of the second game value V2, and the total amount thereof). The hand pay amount includes a total amount of the hand pay and a breakdown thereof (the amount of the first game value V1 and the amount of the second game value V2).

In this manner, the hand pay information (S24) includes the total amount of the hand pay ((the total amount of the first game value V1 and the second game value V2) as a payout amount, the hand pay information (S24) includes the information representing the breakdown (each amount of the first game value V1 and the second game value V2), and the hand pay information (S24) is transmitted from the SMIB device 1700 to the management server 500, such that the management server 500 can grasp the amount of the first game value V1 in the hand pay amount. That is, the member information card is inserted into the slot machine 1010 (the SMIB device 1700), and the credit balance of the member (the first game value V1, the second game value V2, the third game value V3, and the fourth game value V4) is transmitted to the slot machine 1010, such that the management server 500 can grasp the amount of the first game value V1 in the payout amount paid out to the member by the hand pay out of the balance after the game in a state where a part thereof is used for the game. Accordingly, when the hand pay is performed and the balance is paid out to the member, the management server 500 can perform management in consideration of subclassification of the amount paid out thereto (that is, the credit canceled by the hand pay in the slot machine 1010). Specifically, the first game value V1 is the game value for the rolling program, and in the rolling program, by completely using the first game value V1 by the expiration date (Validity Days), a privilege is granted to a member who is a purchaser of the rolling program. Therefore, when the game value paid out in the hand pay process is not subdivided, the management server 500 may make an erroneous determination in which, for example, the first game value V1 is determined to be used and the member acquires the right of a specific grant even though the first game value V1 is not used yet, whereas in the embodiment, the first game value V1 that is not actually used in the slot machine 1010 can be refunded to the member account in a state where the first game value V1 is not used, and the management server 500 can prevent the erroneous determination. That is, in a casino where the rolling program is executed, an appropriate operation in accordance with the classification of the game value can be performed.

The management server 500 receiving the hand pay information (S24) from the SMIB device 1700 compares the hand pay amount in the hand pay information S24 and the member information of the player with the approved information recorded in the approval process (S20), and determines legitimacy thereof, and when determining that the comparison therebetween is legitimate, the management server 500 updates the credit data of the member account by temporarily adding the hand pay amount to the member account. That is, by this update process, the hand pay amount and the player (the member) are temporarily associated with each other (S25). The temporary association indicates that since there is no evidence showing that the player receives the hand pay amount until the player inputs an electronic signature to a receipt, which will be described later, the temporary association is performed until then.

When the management server 500 completes the association between the hand pay information and the player (the member), the management server 500 generates receipt data relating to the hand pay of which association is completed at this time, and transmits the receipt data to the hand pay terminal device 600 as receipt information (S26). This receipt information is data in which pieces of information such as the hand pay amount, member information (a name and a membership number), or the like are described in a receipt form.

The hand pay terminal device 600 receiving the receipt information (S26) displays the receipt including the hand pay amount on a display device provided in the hand pay terminal device 600, and urges the player to perform an electronic signature on this receipt display (S27). The electronic signature is a signature that is input by the hand on an input panel and then the handwritten signature is converted into data and stored.

The player moves from the slot machine 1010 to the hand pay terminal device 600 according to an instruction of the attendant (S104), and when the player performs the electric signature on the hand pay terminal device 600, the hand pay terminal device 600 continuously displays a screen for selecting a method for receiving the hand pay amount on the display device, and urges the player to select the method for receiving the hand pay amount (S28). A first selection method is a cashless process that only performs the process (S24 and S25 described above) of transmitting credit data equivalent to the hand pay amount to the member account of the player (the member) opened in the management server 500, and of adding the credit data equivalent to the hand pay amount to the member account of the player, and a second selection method is a cash process in which the hand pay amount is paid out in cash. In the cash process, the game value to be paid out in cash is limited to the second game value V2 in principle.

When the method for receiving the hand pay amount is selected, the hand pay terminal device 600 transmits, to the management server 500, electronic signature information including input electronic signature data, an electronic slip number corresponding thereto, and information on specifying the receiving method (S29). The management server 500 receiving the electronic signature information officially updates the member account specified by the member information in the electronic signature information (S30). Specifically, when the cashless process, which is the first selection method, is selected, the member account of which temporary association is performed for the hand pay amount in step S25 is officially updated so as to become the balance in which the hand pay amount is added. On the other hand, when the cash payment (the cash process), which is the second selection method, is selected, the update process of the member account is performed by subtracting the hand pay amount temporarily added to the member account. The management server 500 updates the member account, such that the current credit balance is updated, and the balance before the update is stored as history information in the past.

When the cashless process, which is the first selection method, is selected, the hand pay terminal device 600 transmits, to the SMIB device 1700, a writing instruction (S33) to the member information card, such that in the SMIB device 1700, the hand pay amount stored in the RAM 1753 is written to the member information card (the IC card 1500) inserted into the SMIB device 1700 at this time (S34).

When the player selects the cash process which is the second selection method, the hand pay terminal device 600 prints a hand pay receipt in which the hand pay amount or the like is described by a barcode (S31). When the hand pay receipt is printed, the attendant takes the hand pay receipt to the cage (the cashier terminal device 400) (S105) and receives cash and a receipt in exchange for the hand pay receipt (S32). Specifically, in the cage (the cashier terminal device 400), when the hand pay receipt is received from the attendant, a pair of receipts (a receipt for an attendant signature and a receipt for a player signature) are issued, and these receipts are handed over to the attendant. The attendant fills in his or her (the attendant) signature on the receipt for the attendant signature and returns the signed receipt to the cage. The cage receiving the receipt on which the attendant signature is written hands over cash corresponding to a face value (the hand pay amount) of the receipt in exchange for the receipt for the attendant signature to the attendant.

The attendant gives the player the receipt for the player signature, and the player fills in his or her signature on the receipt and returns the signed receipt to the attendant. The attendant gives the cash to the player in exchange for the receipt on which the player signature is written and returns the receipt to the cage. The cage keeps the receipt on which the attendant signature is written and the receipt on which the player signature is written. When the player wishes to receive a copy of the receipt on which the player signature is written, the copy of the receipt is given to the player.

As described above, in the hand pay process of the embodiment, when the hand pay is generated in the slot machine 1010, the information on the cancellation amount of the slot machine 1010 is stored in the member account of the management server 500, that as the hand pay process when the hand pay is generated, the cashless process can be performed without actually handing cash over to the player.

Processing time required for the hand pay process can be shortened by making it possible to perform the hand pay process without cash in this manner. It is also possible to prevent occurrence of a human error by eliminating cash receipts and payments. It becomes unnecessary that cash is handed over to an attendant in the cage and the attendant hands cash over to the player as in related art, thereby making it possible to provide a system in which it is difficult for the attendant to perform a fraudulent behavior related to the handling of cash. Since the player can transmit the amount of money related to the hand pay to the member account simply by checking the face value of the receipt displayed on the display device of the hand pay terminal device 600 and filling in the electronic signature, the player can receive the amount of money related to the hand pay without a troublesome labor of manually counting the amount of cash as in related art.

Figure 13:
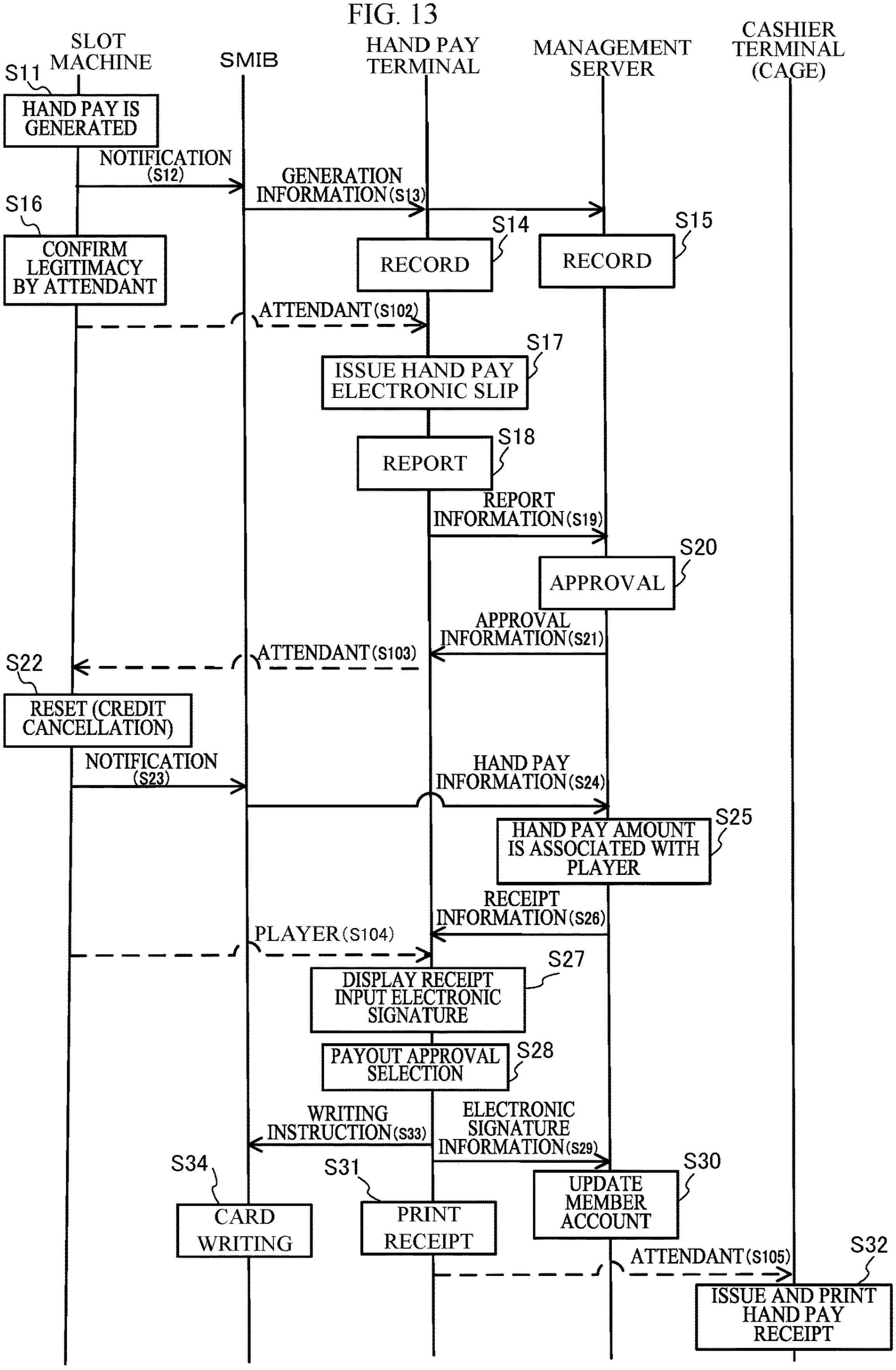
FIG. 13 is a flowchart illustrating a payout process at the time of generation of a hand pay according to an embodiment of the present invention.
Figure 15:
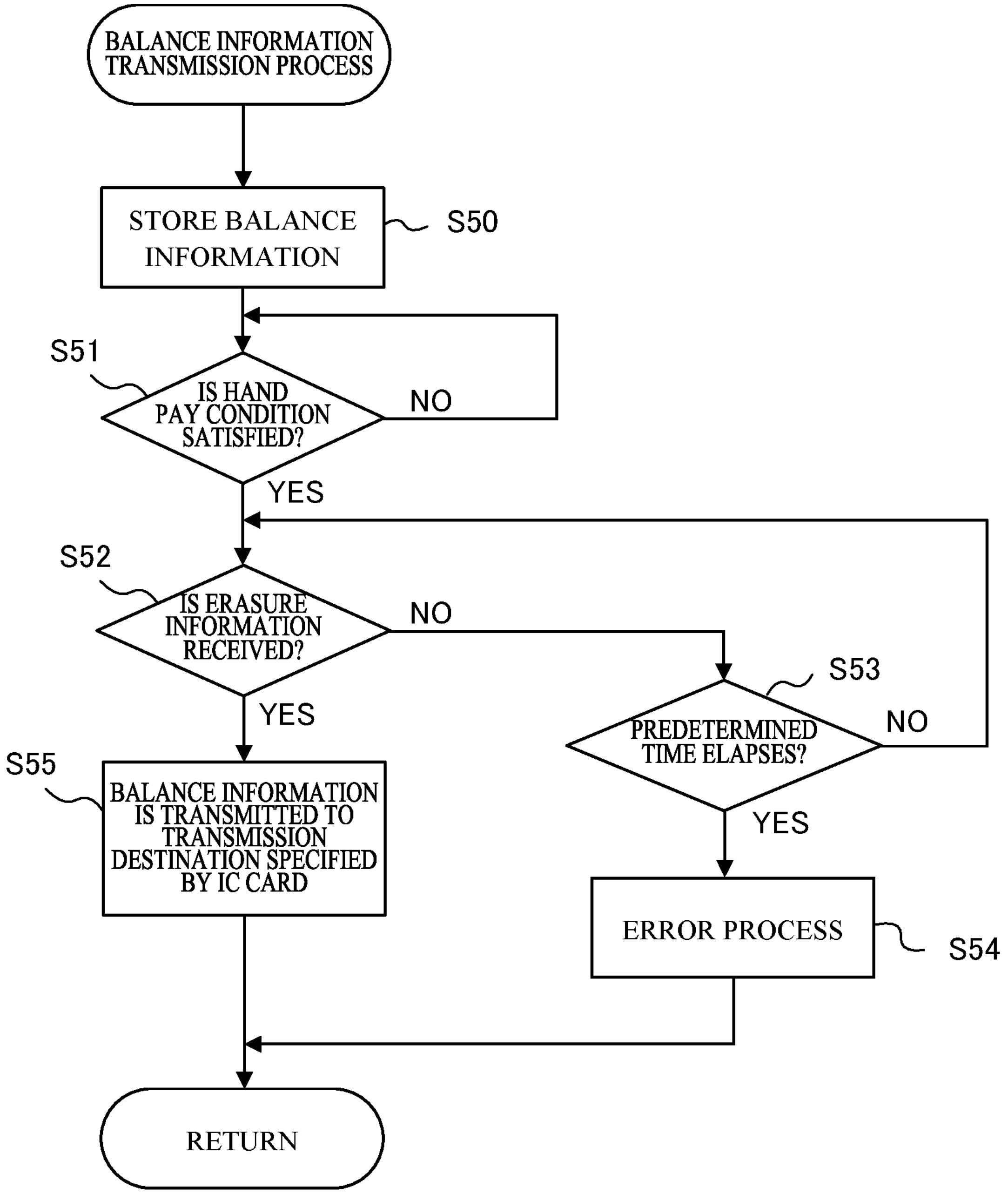
FIG. 15 is a flowchart illustrating a balance transmission process by the SMIB device.

FIG. 15 is a flowchart illustrating a process (a credit balance transmission process) in which the reset key switch 1019 is operated from the process (S11) when the hand pay is generated (S22) among the processes of the SMIB device in FIG. 13, and credit balance information adds the credit data corresponding to the hand pay amount to the member account of the player of the management server 500 from the SMIB device 1700.

In this process, the SMIB device 1700 stores credit balance information transmitted from the slot machine 1010 in the RAM 1753 (FIG. 6) in association with member information (information acquired from a member information card) of a player who is playing a game at this time (S50). When a hand pay is validated in the slot machine 1010, this process may be performed by any one of a method in which the credit balance information stored in the game controller 70 of the slot machine 1010 is transmitted from the slot machine 1010 to the SMIB device 1700, and an update method in which every time a credit balance is updated as the game progresses in the slot machine 1010, the updated credit balance is transmitted from the slot machine 1010 to the SMIB device 1700, and stored in the RAM 1753 of the SMIB device 1700 (described above with reference to FIG. 11).

Next, in step S51, the SMIB device 1700 determines whether or not a hand pay condition is satisfied in the slot machine 1010. When the hand pay is validated in the slot machine 1010, the notification (S12) is transmitted from the slot machine 1010 to the SMIB device 1700, thereby making it possible to recognize that the hand pay is validated in the SMIB device 1700.

The SMIB device 1700 repeats the process of step S51 until receiving the notification from the slot machine 1010 that the hand pay is validated. When receiving the notification indicating that the hand pay is validated, the SMIB device 1700 obtains a positive result in step S51, shifts the process from step S51 to step S52, and determines whether or not erasure information is received from the slot machine 1010.

The erasure information is information transmitted to the SMIB device 1700 under the control of the game controller 70 when an attendant operates the reset key switch 1019 in the slot machine 1010 and the credit cancellation process is performed (S23 (FIG. 13)).

When the SMIB device 1700 determines that the erasure information is not received, the SMIB device 1700 obtains a negative result in step S52, shifts the process from step S52 to step S53, and determines whether or not a predetermined time elapses. When receiving the notification from the slot machine 1010 indicating that the hand pay condition is validated (S51: YES), the SMIB device 1700 starts an internal timer and measures an elapsed time from the start time. When a preset processing time does not elapse, the SMIB device 1700 obtains a negative result in step S53, shifts the process from step S53 to step S52 described above, and repeats the same process.

On the other hand, when the positive result is obtained in step S53, this indicates that the SMIB device 1700 does not receive the erasure information from the slot machine 1010 even after a predetermined time elapses after receiving the information indicating that the hand pay is validated from the slot machine 1010, such that the SMIB device 1700 shifts the process from step S53 to step S54 and executes an error process to display that an error occurs on the LCD 1719 of the SMIB device 1700 and to transmit error occurrence information to the management server 500.

On the other hand, when the positive result is obtained in step S52, this indicates that the SMIB device 1700 receives the erasure information from the slot machine 1010 within a predetermined time after the hand pay is validated in the slot machine 1010, that is, this indicates that the attendant operates the reset key switch 1019 of the slot machine 1010, such that the SMIB device 1700 shifts the process from step S52 to step S55, and transmits the hand pay information S24 (FIG. 13) including a hand pay amount representing a credit balance at this time to the member account on the management server 500 specified by the member information obtained from the IC card 1500 being inserted into the card unit 1741 at this time (FIG. 6).

Accordingly, in the member account opened in the management server 500, the credit balance (the hand pay amount) of the player in the slot machine 1010 when the reset key switch 1019 of the slot machine 1010 is operated and the credit cancellation process is performed is transmitted to the member account of the management server 500. That is, the credit balance (the hand pay amount) is paid out to the player by a method of transmitting data representing the amount of money by a process (a process by the SMIB device 1700) different from the payout process in the slot machine 1010.

Other Embodiments

While the above-described embodiment describes a case in which the hand pay terminal device 600 is installed at a fixed position in a casino hall, the embodiment is not limited thereto and may use a portable terminal device as the hand pay terminal device 600. In this case, when a hand pay is generated, an attendant takes a portable hand pay terminal device and goes to the slot machine 1010, such that the process of issuing the electronic slip (S17) and the process of causing a player to input an electronic signature into the hand pay terminal device (S27) can be performed while the attendant and the player are in the slot machine 1010. That is, the hand pay process can be performed more smoothly.

While the above-described embodiment describes a case in which the hand pay process is performed when a prize of a predetermined amount or more such as a jackpot or the like is generated, the embodiment is not limited thereto. For example, even when inconvenience occurs in the slot machine 1010, the same process as the hand pay process according to the embodiment can be performed. Accordingly, for example, even when the credit data stored in the slot machine 1010 cannot be paid out due to the inconvenience of the slot machine 1010, the credit data remaining in the slot machine 1010 can be manually paid out to the player by the hand pay process together with the operation of the reset key switch 1019, such that cashless and smooth process can be performed by executing the process of the embodiment as this hand pay process.

While the above-described embodiment describes a case in which the hand pay amount is officially associated with the member account of the management server 500 when the player inputs the electronic signature in the hand pay terminal device 600, the embodiment is not limited thereto. When the attendant operates the reset key switch 1019 of the slot machine 1010 (S22), the player and the hand pay amount may be immediately associated with each other.

While the above-described embodiment describes a case in which the player inputs the electronic signature via the hand pay terminal device 600 after the reset key switch 1019 is operated (S22), the embodiment is not limited thereto. The operation of the reset key switch 1019 may be performed (the operation becomes possible) after the player inputs the electronic signature.

While the above-described embodiment describes a case in which the IC card 1500, which is a card-shaped medium, is used as the member information card associated with the member information or the non-member information card used by the non-member, the embodiment is not limited thereto. For example, various other portable information media such as a portable terminal device or the like can be widely applied. When the portable terminal device is used, instead of the IC card control unit 1763 (FIG. 6), the SMIB device 1700 may include an RFID module for performing, for example, near field communication with the portable terminal device.

While the above-described embodiment describes a case in which the player inputs the electronic signature in the hand pay terminal device 600 (FIG. 7), instead of the electronic signature, for example, the player can operate a predetermined confirmation input button of the hand pay terminal device 600, that is, the point is that various other configurations can be used as long as a result confirmed by the player can be input.

While the embodiments of the present invention are described above, the embodiments only describe specific examples and do not particularly limit the present invention, and a specific configuration of each unit or the like can be appropriately modified. The effects described in the embodiments of the present invention are only a list of the most desirable effects obtained from the present invention, and the effects of the present invention are not limited to those described in the embodiments of the present invention.

In the above-described detailed descriptions, a characteristic part is mainly described so as to more easily understand the present invention. The present invention is not limited to the embodiments described in the detailed descriptions, but can be also applied to other embodiments and the scope of application thereof is varied. The terminology and the phase used in the present specification are used to accurately describe the present invention, and are not used to limit the interpretation of the present invention. It may be easy for those skilled in the art to reconsider other configurations, systems, methods, or the like in the concept of the present invention from the concept of the present invention described in the present specification. Therefore, the description of the scope of the claims shall be deemed to include an equivalent configuration without departing from the scope of the technical ideas of the present invention. An object of the abstract is to enable the patent office, a general public institution, and an engineer belonging to the technical field who is not familiar with patents, legal terms, or technical terms to quickly determine the technical content of the present application and nature thereof with a simple investigation. Therefore, the abstract is not intended to limit the scope of the invention to be evaluated by the descriptions of the scope of the claims. In order to fully understand the object of the present invention and the specific effect thereof, it is desirable that the pieces of literature already disclosed are interpreted with due consideration.

The above-described detailed descriptions include a process executed by a computer. The above descriptions and expressions are intended to help those skilled in the art to understand most efficiently. In the present specification, each step used to derive one result should be understood as a process that is not self-contradictory. In each step, transmission and reception, recording, or the like of an electrical or magnetic signal are performed. In the process in each step, while such a signal is represented with bits, values, symbols, characters, terms, numbers, or the like, it should be noted that these are only used for the convenience of the descriptions. While the process in each step may be described with expressions common to a human behavior, the process described in the present specification is basically performed by various devices. Other configurations required for performing each step become obvious from the above descriptions.

REFERENCE SIGNS LIST

100: casino system
500: management server
400: cashier terminal device
600: hand pay terminal device
1010A, 1010B: slot machine
1019: reset key switch
1500: IC card
1700: SMIB device

The invention claimed is:

1. An information processing device connected to be able to transmit and receive information to and from a gaming machine that can play a game according to an input game value, grant a player a prize according to a result of the game, and store a balance of the game value, the device comprising:

an information processing unit that is configured to be able to transmit game value information that can be used for the game to an outside in association with registered information; and an interface that is capable of transmitting and receiving the information to and from the gaming machine, wherein the information processing unit distinguishes and manages a plurality of types of game values as the game value information; and, wherein when receiving, from the gaming machine, condition satisfaction information indicating that a predetermined condition for granting the prize to the player separately from a process of the gaming machine is satisfied, and receiving, from the gaming machine, erasure information indicating erasure of balance information of the game value stored in the gaming machine, the information processing unit transmits the balance information of the game value to the outside so that the plurality of types of game values can be distinguished.

2. The information processing device according to claim 1, further comprising:

an information medium interface that receives an information media associated with specific information that specifies a player playing a game on the gaming machine, wherein the information processing unit transmits the balance information to an account corresponding to the player specified via the received information medium.

3. The information processing device according to claim 2, wherein the plurality of types of game values includes:

a first game value that can be used for playing the game, and the cash conversion of which is restricted; and a second game value that can be directly converted into cash.

4. A payout management system, comprising:

an information processing device that is connected to a gaming machine capable of playing a game according to an input game value and capable of storing a balance of the game value, and that can transmit information on the gaming machine to an outside; and an information medium interface that receives an information medium associated with specific information that specifies a player playing a game on the gaming machine, wherein the information processing device distinguishes and manages a plurality of types of game values as the game value information, and when receiving, from the gaming machine, condition satisfaction information indicating that a predetermined condition for granting the prize to the player separately from a process of the gaming machine is satisfied, and receiving, from the gaming machine, erasure information indicating erasure of balance information of the game value stored in the gaming machine, the information processing device transmits the balance information of the game value by distinguishing the plurality of types of game values to an account corresponding to the player specified via the information medium received by the information medium interface.

5. The payout management system according to claim 4, wherein the plurality of types of game values includes:

a first game value that can be used for playing the game, and the cash conversion of which is restricted; and a second game value that can be directly converted into cash.

* * * * *